US011742118B2

(12) United States Patent
Hill

(10) Patent No.: US 11,742,118 B2
(45) Date of Patent: *Aug. 29, 2023

(54) INCREASED RESONANT FREQUENCY ALKALI-DOPED Y-PHASE HEXAGONAL FERRITES

(71) Applicant: Skyworks Solutions, Inc., Irvine, CA (US)

(72) Inventor: Michael David Hill, Emmitsburg, MD (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,298

(22) Filed: Apr. 14, 2021

(65) Prior Publication Data

US 2021/0343455 A1 Nov. 4, 2021

Related U.S. Application Data

(63) Continuation of application No. 16/025,716, filed on Jul. 2, 2018, now Pat. No. 11,004,581, which is a continuation of application No. 14/887,716, filed on Oct. 20, 2015, now Pat. No. 10,032,547.

(60) Provisional application No. 62/068,146, filed on Oct. 24, 2014, provisional application No. 62/068,139, filed on Oct. 24, 2014, provisional application No. 62/068,147, filed on Oct. 24, 2014, provisional application No. 62/068,151, filed on Oct. 24, 2014.

(51) Int. Cl.
| | |
|---|---|
| H01F 1/01 | (2006.01) |
| C04B 35/26 | (2006.01) |
| H01F 1/34 | (2006.01) |
| H01F 1/10 | (2006.01) |
| H01Q 1/36 | (2006.01) |
| H01F 1/36 | (2006.01) |
| H01Q 7/06 | (2006.01) |

(52) U.S. Cl.
CPC .............. *H01F 1/01* (2013.01); *C04B 35/26* (2013.01); *C04B 35/2633* (2013.01); *H01F 1/10* (2013.01); *H01F 1/348* (2013.01); *H01F 1/36* (2013.01); *H01Q 1/36* (2013.01); *H01Q 1/364* (2013.01); *H01Q 7/06* (2013.01); *C04B 2235/3201* (2013.01); *C04B 2235/3213* (2013.01); *C04B 2235/3217* (2013.01); *C04B 2235/3224* (2013.01); *C04B 2235/3225* (2013.01); *C04B 2235/3229* (2013.01); *C04B 2235/3232* (2013.01); *C04B 2235/3241* (2013.01); *C04B 2235/3244* (2013.01); *C04B 2235/3262* (2013.01); *C04B 2235/3275* (2013.01); *C04B 2235/3286* (2013.01); *C04B 2235/3287* (2013.01); *C04B 2235/3293* (2013.01); *C04B 2235/3418* (2013.01); *C04B 2235/767* (2013.01); *C04B 2235/80* (2013.01)

(58) Field of Classification Search
CPC ........ H01F 1/10; H01F 1/348; C04B 35/2633
See application file for complete search history.

(56) References Cited

U.S. PATENT DOCUMENTS

| | | | |
|---|---|---|---|
| 4,425,250 A | 1/1984 | Hibst | |
| 4,469,669 A | 9/1984 | Hibst | |
| 4,664,831 A | 5/1987 | Hibst et al. | |
| 6,893,581 B2 | 5/2005 | Umemoto et al. | |
| 7,482,977 B2 | 1/2009 | Kuroda et al. | |
| 7,679,569 B2 | 3/2010 | Takaki et al. | |
| 7,999,758 B2 | 8/2011 | Bae et al. | |
| 8,228,059 B2 | 7/2012 | Iwasaki et al. | |
| 8,253,643 B2 | 8/2012 | Kato et al. | |
| 8,524,190 B2 | 9/2013 | Hill | |
| 8,758,721 B2 | 6/2014 | Hill | |
| 10,026,530 B2 * | 7/2018 | Hill | ............... H01Q 7/06 |
| 10,027,035 B2 | 7/2018 | Hill | |
| 10,032,547 B2 * | 7/2018 | Hill | ............ H01Q 1/364 |
| 10,049,796 B2 * | 8/2018 | Hill | ............... H01F 1/36 |
| 10,276,287 B2 | 4/2019 | Hill | |
| 10,461,436 B2 * | 10/2019 | Hill | ............ H01F 1/348 |
| 10,604,450 B2 | 3/2020 | Hill et al. | |
| 10,971,288 B2 | 4/2021 | Hill | |
| 10,984,928 B2 * | 4/2021 | Hill | ............... H01Q 7/06 |

(Continued)

FOREIGN PATENT DOCUMENTS

| | | |
|---|---|---|
| CN | 1405799 | 3/2003 |
| CN | 1528002 | 9/2004 |

(Continued)

OTHER PUBLICATIONS

Aslam et al., "High frequency electrical transport properties of $CoFe_2O_4$ and $Sr_2NiMnFe_{12}O_{22}$ composite ferrites", Ceramics International, 40:155-162 (2014).
European Extended Search Report for Application No. 15191110.4 dated Mar. 14, 2016, in 9 pages.
Extended European Search Report for Application No. 15187687.7, dated Feb. 23, 2016, in 8 pages.
European Extended Search Report for Application No. 15191112.0 dated Jun. 17, 2016, in 8 pages.
Extended European Search Report for Application No. 15191106.2, dated Feb. 26, 2016, in 11 pages.

*Primary Examiner* — C Melissa Koslow
(74) *Attorney, Agent, or Firm* — Knobbe, Martens, Olson & Bear, LLP

(57) ABSTRACT

Disclosed herein are embodiments of an enhanced resonant frequency hexagonal ferrite material, such as Y-phase hexagonal ferrite material, and methods of manufacturing. In some embodiments, sodium or potassium can be added into the crystal structure of the hexagonal ferrite material in order to achieve improved resonant frequencies in the range of 500 MHz to 1 GHz useful for radiofrequency applications.

20 Claims, 19 Drawing Sheets

(56) References Cited

U.S. PATENT DOCUMENTS

| | | |
|---|---|---|
| 11,004,581 B2 | 5/2021 | Hill |
| 11,069,983 B2 | 7/2021 | Hill |
| 11,164,689 B2 * | 11/2021 | Hill .................. H01Q 1/36 |
| 11,551,837 B2 | 1/2023 | Hill |
| 2003/0091841 A1 | 5/2003 | Marusawa |
| 2008/0149882 A1 | 6/2008 | Terazono et al. |
| 2009/0297432 A1 | 12/2009 | Hill |
| 2010/0156733 A1 | 6/2010 | Kato et al. |
| 2011/0025572 A1 | 2/2011 | Lee et al. |
| 2011/0305890 A1 | 12/2011 | Iwasaki et al. |
| 2012/0177951 A1 | 7/2012 | Yamazaki et al. |
| 2013/0115160 A1 | 5/2013 | Hill |
| 2013/0265205 A1 | 10/2013 | Okano et al. |
| 2013/0285874 A1 | 10/2013 | Hill |
| 2013/0292602 A1 | 11/2013 | Hill |
| 2014/0138571 A1 | 5/2014 | Kim et al. |
| 2018/0366835 A1 | 12/2018 | Hill |
| 2018/0374616 A1 | 12/2018 | Hill |
| 2019/0006067 A1 | 1/2019 | Hill |
| 2019/0019605 A1 | 1/2019 | Hill |
| 2019/0267164 A1 | 8/2019 | Hill |
| 2021/0304928 A1 | 9/2021 | Hill |
| 2021/0366634 A1 | 11/2021 | Hill |
| 2022/0013263 A1 | 1/2022 | Hill |

FOREIGN PATENT DOCUMENTS

| | | |
|---|---|---|
| CN | 1767087 | 5/2006 |
| CN | 101014548 | 8/2007 |
| CN | 101998934 | 3/2011 |
| CN | 102076629 | 5/2011 |
| EP | 0303151 | 2/1989 |
| EP | 1798210 | 6/2007 |
| EP | 1837949 | 9/2007 |
| EP | 2320434 | 5/2011 |
| EP | 2418730 | 2/2012 |
| JP | S58-41728 | 3/1983 |
| JP | 10-117086 | 5/1998 |
| JP | 2000-173812 | 6/2000 |
| JP | 2002-116632 | 4/2002 |
| JP | 2003-002656 | 1/2003 |
| JP | 2004-002110 | 1/2004 |
| JP | 2004-040053 | 2/2004 |
| JP | 2006-064839 | 3/2006 |
| JP | 2007-039301 | 2/2007 |
| JP | 2007-055832 | 3/2007 |
| JP | 2007-119321 | 5/2007 |
| JP | 2009-170704 | 7/2009 |
| JP | 2010-114407 | 5/2010 |
| JP | 2011-521865 | 7/2011 |
| JP | 2011-530479 | 12/2011 |
| JP | 2013-183776 | 9/2013 |
| WO | WO 2006/064839 | 6/2008 |
| WO | WO 2010/107098 | 9/2010 |
| WO | WO 2010/117156 | 10/2010 |
| WO | WO 2012/103020 | 8/2012 |

\* cited by examiner

INCREASED RESONANT FREQUENCY ALKALI-DOPED Y-PHASE HEXAGONAL FERRITES

INCORPORATION BY REFERENCE TO ANY PRIORITY APPLICATIONS

This Application is a continuation of U.S. patent application Ser. No. 16/025,716, filed Jul. 2, 2018, which issued as U.S. Pat. No. 11,004,581 and is a continuation of U.S. patent application Ser. No. 14/887,716, filed Oct. 20, 2015, titled "INCREASED RESONANT FREQUENCY ALKALI-DOPED Y-PHASE HEXAGONAL FERRITES", which issued as U.S. Pat. No. 10,032,547 and claims from the benefit of U.S. Provisional Application No. 62/068,147, filed Oct. 24, 2014, titled "INCREASED RESONANT FREQUENCY ALKALI-DOPED Y-PHASE HEXAGONAL FERRITES," 62/068,139, filed Oct. 24, 2014, titled "INCREASED RESONANT FREQUENCY POTASSIUM-DOPED HEXAGONAL FERRITE," 62/068,146, filed Oct. 24, 2014, titled "MAGNETODIELECTRIC Y-PHASE STRONTIUM HEXAGONAL FERRITE MATERIALS FORMED BY SODIUM SUBSTITUTION," and 62,068,151, filed Oct. 24, 2014, titled "INCORPORATION OF OXIDES INTO FERRITE MATERIAL FOR IMPROVED RADIOFREQUENCY PROPERTIES," the entirety of each of which is incorporated herein by reference.

BACKGROUND

Field

Embodiments of the disclosure relate to methods of preparing compositions and materials useful in electronic applications, and in particular, useful in radio frequency (RF) electronics.

Description of the Related Art

For magnetodielectric antenna applications, it can be advantageous to have as high a permeability as possible (for better miniaturization factor and impedance match in free space) and as great a resonant frequency (maximum operating frequency) as possible. However, materials known in the art with higher permeability tend to have low magnetic resonance frequencies, such as a resonant frequency well above 1 GHz but a permeability of only 2.

Some previous solutions have increased permeability, but are limited to a maximum useable frequency of about 500 MHz. Some modest improvements of resonant frequencies have been detailed, though they have not significantly extended the useable frequency range for hexagonal ferrite materials.

Further, it can be advantageous to miniaturize antenna systems able to operate at frequencies of 500 MHz or above. One method of achieving this miniaturization is to use magnetodielectric antennas where the miniaturization factor is proportional to the square root of the product of the permeability and permittivity at a given frequency. In this case, the magnetic interaction with RF radiation is utilized to miniaturize the antenna along with the dielectric component. Other considerations are that the material must be insulating and that it is advantageous that the permittivity and permeability be as close to one another as possible to minimize the impedance mismatch and reflection losses). One barrier for improved materials is that there are no insulating magnetic materials with a permeability above 700 MHz with appreciably low losses. Improving either the permeability at a given frequency or increasing the magnetic Q will increase the frequency of use of magnetodielectric antennas into the commercially and militarily important microwave region.

SUMMARY

Disclosed herein are embodiments of a method for increasing the resonant frequency of a hexagonal ferrite material comprising providing a Y phase hexagonal ferrite material having the composition $Sr_2Co_2Fe_{12}O_{22}$ and doping the hexagonal ferrite with Na, K or other univalent alkali metal on an Sr site and charge compensating with scandium or indium on a cobalt site.

In some embodiments, the hexagonal ferrite material can be doped with silicon, aluminum, manganese, or any combination of the three. In some embodiments, the hexagonal ferrite can be doped with silicon, and the silicon acts as a grain growth inhibitor. In some embodiments, the hexagonal ferrite can be doped with manganese, and the manganese prevents reduction of the iron in the composition to $Fe^{3+}$.

In some embodiments, scandium can be used for charge compensating. In some embodiments, indium can be used for charge compensating.

In some embodiments, the hexagonal ferrite can have a loss factor of less than about 6 at a frequency of 1 GHz.

Also disclosed herein are embodiments of a hexagonal ferrite material having enhanced resonant frequency comprising a Y phase hexagonal ferrite material having the composition $Sr_2Co_2Fe_{12}O_{22}$, the material being doped with Na, K or other univalent alkali metal on an Sr site and including scandium or indium on a cobalt site.

In some embodiments, the hexagonal ferrite material can be doped with silicon, aluminum, manganese, or any combination of the three. In some embodiments, the hexagonal ferrite can be doped with silicon, and the silicon acts as a grain growth inhibitor. In some embodiments, the hexagonal ferrite can be doped with manganese, and the manganese prevents reduction of the iron in the composition to $Fe^{3+}$.

In some embodiments, scandium can be used for charge compensating. In some embodiments, indium can be used for charge compensating.

In some embodiments, the hexagonal ferrite can have a loss factor of less than about 6 at a frequency of 1 GHz.

Also disclosed herein are embodiments of a radiofrequency device comprising a Y phase hexagonal ferrite material having the composition $Sr_2Co_2Fe_{12}O_{22}$, the material being doped with Na, K or other univalent alkali metal on an Sr site and including scandium or indium on a cobalt site.

In some embodiments, the hexagonal ferrite material can be doped with silicon, aluminum, manganese, or any combination of the three. In some embodiments, the hexagonal ferrite can be doped with silicon, and the silicon acts as a grain growth inhibitor. In some embodiments, the hexagonal ferrite can be doped with manganese, and the manganese prevents reduction of the iron in the composition to $Fe^{3+}$.

In some embodiments, scandium can be used for charge compensating. In some embodiments, indium can be used for charge compensating.

In some embodiments, the hexagonal ferrite can have a loss factor of less than about 6 at a frequency of 1 GHz.

Disclosed herein are embodiments of a method for doping a Y-phase hexagonal ferrite material with potassium comprising providing a Y-phase strontium hexagonal ferrite material and substituting at least some of the strontium with a trivalent ion composition including potassium or a tetravalent ion composition including potassium to form a high resonant frequency hexagonal ferrite, the composition being $Sr_{2-x}K_xCo_{2-x}M_xFe_{12}O_{22}$ when a trivalent ion is used for the substitution, M being any trivalent ion, and the composition being $Sr_{2-2x}K_{2x}Co_{2-x}N_xFe_{12}O_{22}$ when a tetravalent ion is used for the substitution, N being any tetravalent ion.

In some embodiments, x can be from 0 to 1.5 in the trivalent substitution and from 0 to 0.75 in the tetravalent substitution. In some embodiments, the Y-phase strontium hexagonal ferrite material can include $Sr_2Co_2Fe_{12}O_{22}$.

In some embodiments, M can be selected from the group consisting of Sc, Mn, In, Cr, Ga, Co, Ni, Fe, Yb, or any of the lanthanide ions. In some embodiments, N can be selected from the group consisting of Si, Ge, Ti, Zr, Sn, Ce, Pr, Hf, or Tb.

In some embodiments, the high resonant frequency hexagonal ferrite can have a loss factor below 1 at 1 GHz.

In some embodiments, the high resonant frequency hexagonal ferrite can have a composition of $Sr_{1.75}K_{0.25}Co_{1.75}Sc_{0.25}Fe_{12}O_{22}$ or $Sr_{1.75}K_{0.25}Co_{1.75}In_{0.25}Fe_{12}O_{22}$. In some embodiments, the high resonant frequency hexagonal ferrite can have a composition of $Sr_{1.5}K_{0.5}Co_{1.5}In_{0.5}Fe_{12}O_{22}$ or $Sr_{1.5}K_{0.5}Co_{1.5}In_{0.5}Fe_{12}O_{22}$.

Also disclosed herein are embodiments of an antenna for use in radiofrequency operations comprising a Y-phase strontium hexagonal ferrite material having at least some of the strontium substituted out for a trivalent ion composition including potassium or a tetravalent ion composition including potassium to form a high resonant frequency hexagonal ferrite, the composition being $Sr_{2-x}K_xCo_{2-x}M_xFe_{12}O_{22}$ when a trivalent ion is used for the substitution, M being any trivalent ion, and the composition being $Sr_{2-2x}K_{2x}Co_{2-x}N_xFe_{12}O_{22}$ when a tetravalent ion is used for the substitution, N being any tetravalent ion.

In some embodiments, x can be from 0 to 1.5 in the trivalent substitution and from 0 to 0.75 in the tetravalent substitution. In some embodiments, the Y-phase strontium hexagonal ferrite material can include $Sr_2Co_2Fe_{12}O_{22}$.

In some embodiments, M can be selected from the group consisting of Sc, Mn, In, Cr, Ga, Co, Ni, Fe, Yb, or any of the lanthanide ions. In some embodiments, N can be selected from the group consisting of Si, Ge, Ti, Zr, Sn, Ce, Pr, Hf, or Tb.

In some embodiments, the high resonant frequency hexagonal ferrite can have a loss factor below 1 at 1 GHz.

In some embodiments, the high resonant frequency hexagonal ferrite can have a composition of $Sr_{1.75}K_{0.25}Co_{1.75}Sc_{0.25}Fe_{12}O_{22}$ or $Sr_{1.75}K_{0.25}Co_{1.75}In_{0.25}Fe_{12}O_{22}$. In some embodiments, the high resonant frequency hexagonal ferrite can have a composition of $Sr_{1.5}K_{0.5}Co_{1.5}In_{0.5}Fe_{12}O_{22}$ or $Sr_{1.5}K_{0.5}Co_{1.5}In_{0.5}Fe_{12}O_{22}$.

Also disclosed herein are embodiments of a potassium doped Y-phase hexagonal ferrite material comprising a Y-phase strontium hexagonal ferrite material having at least some of the strontium substituted out for a trivalent ion composition including potassium or a tetravalent ion composition including potassium to form a high resonant frequency hexagonal ferrite, the composition being $Sr_{2-x}K_xCo_{2-x}M_xFe_{12}O_{22}$ when a trivalent ion is used for the substitution, M being any trivalent ion, and the composition being $Sr_{2-2x}K_{2x}Co_{2-x}N_xFe_{12}O_{22}$ when a tetravalent ion is used for the substitution, N being any tetravalent ion.

In some embodiments, x can be from 0 to 1.5 in the trivalent substitution and from 0 to 0.75 in the tetravalent substitution. In some embodiments, the Y-phase strontium hexagonal ferrite material can include $Sr_2Co_2Fe_{12}O_{22}$.

In some embodiments, M can be selected from the group consisting of Sc, Mn, In, Cr, Ga, Co, Ni, Fe, Yb, or any of the lanthanide ions. In some embodiments, N can be selected from the group consisting of Si, Ge, Ti, Zr, Sn, Ce, Pr, Hf, or Tb.

In some embodiments, the high resonant frequency hexagonal ferrite can have a loss factor below 1 at 1 GHz.

In some embodiments, the high resonant frequency hexagonal ferrite can have a composition of $Sr_{1.75}K_{0.25}Co_{1.75}Sc_{0.25}Fe_{12}O_{22}$ or $Sr_{1.75}K_{0.25}Co_{1.75}In_{0.25}Fe_{12}O_{22}$. In some embodiments, the high resonant frequency hexagonal ferrite can have a composition of $Sr_{1.5}K_{0.5}Co_{1.5}In_{0.5}Fe_{12}O_{22}$ or $Sr_{1.5}K_{0.5}Co_{1.5}In_{0.5}Fe_{12}O_{22}$.

Disclosed herein are embodiments of a magnetodielectric hexagonal ferrite comprising a Y-phase strontium hexagonal ferrite material having sodium substituted for strontium and including a trivalent or tetravalent ion to form a magnetodielectric hexagonal ferrite, the composition of the magnetodielectric hexagonal ferrite being $Sr_{2-x}Na_xCo_{2-x}M_xFe_{12}O_{22}$ when a trivalent ion is used, where M is a trivalent ion, and the composition of the magnetodielectric hexagonal ferrite being $Sr_{2-2x}Na_{2x}Co_{2x}N_xFe_{12}O_{22}$ when a tetravalent ion is used, where N is a tetravalent ion.

In some embodiments, M can be selected from the group consisting of Al, Ga, Sc, Cr, Mn, In, Yb, Er, Y or other lanthanide. In some embodiments, N can be selected from the group consisting of Si, Ge, Ti, Zr, Sn, Ce, Pr, Hf, or Tb. In some embodiments, x can be from 0 to about 1.5 in the trivalent substitution and from 0 to about 0.75 in the tetravalent substitution.

In some embodiments, the magnetodielectric hexagonal ferrite can have the composition $Sr_{1.75}Na_{0.25}Co_{1.75}M_{0.25}Fe_{12}O_{22}$. In some embodiments, the magnetodielectric hexagonal ferrite can have the composition $Sr_{1.5}Na_{0.5}Co_{1.5}M_{0.5}Fe_{12}O_{22}$.

In some embodiments, the loss factor of the magnetodielectric hexagonal ferrite can remain below 4 at frequencies up to 1 GHz. In some embodiments, the magnetodielectric hexagonal ferrite can have a permeability of between around 5 and around 6 up to 1 GHz.

Also disclosed herein are embodiments of a method for improving magnetic properties of a hexagonal ferrite material comprising substituting sodium into a Y-phase strontium hexagonal ferrite material for strontium and charge balancing either using a trivalent or tetravalent ion to form a magnetodielectric hexagonal ferrite, the composition of the magnetodielectric hexagonal ferrite being $Sr_{2-x}Na_xCo_{2-x}M_xFe_{12}O_{22}$ when a trivalent ion is used, where M is a trivalent ion, and the compositions of the magnetodielectric hexagonal ferrite being $Sr_{2-2x}Na_{2x}Co_{2x}N_xFe_{12}O_{22}$ when a tetravalent ion is used, where N is a tetravalent ion.

In some embodiments, M can be selected from the group consisting of Al, Ga, Sc, Cr, Mn, In, Yb, Er, Y or other lanthanide. In some embodiments, N can be selected from the group consisting of Si, Ge, Ti, Zr, Sn, Ce, Pr, Hf, or Tb. In some embodiments, x can be from 0 to about 1.5 in the trivalent substitution and from 0 to about 0.75 in the tetravalent substitution.

In some embodiments, the magnetodielectric hexagonal ferrite can have the composition $Sr_{1.75}Na_{0.25}Co_{1.75}M_{0.25}Fe_{12}O_{22}$. In some embodiments, the magnetodielectric hexagonal ferrite can have the composition $Sr_{1.5}Na_{0.5}Co_{1.5}M_{0.5}Fe_{12}O_{22}$.

In some embodiments, the loss factor of the magnetodielectric hexagonal ferrite can remain below 4 at frequencies up to 1 GHz. In some embodiments, the magnetodielectric hexagonal ferrite can have a permeability of between around 5 and around 6 up to 1 GHz.

Also disclosed herein are embodiments of a magnetodielectric antenna comprising a Y-phase strontium hexagonal ferrite material having sodium substituted for strontium and including a trivalent or tetravalent ion to form a magnetodielectric hexagonal ferrite, the composition of the magnetodielectric hexagonal ferrite being $Sr_{2-x}Na_xCo_{2-x}M_xFe_{12}O_{22}$ when a trivalent ion is used, where M is a trivalent ion, and the composition of the magnetodielectric hexagonal ferrite being $Sr_{2-2x}Na_{2x}Co_{2-x}N_xFe_{12}O_{22}$ when a tetravalent ion is used, where N is a tetravalent ion.

In some embodiments, M can be selected from the group consisting of Al, Ga, Sc, Cr, Mn, In, Yb, Er, Y or other lanthanide. In some embodiments, N can be selected from the group consisting of Si, Ge, Ti, Zr, Sn, Ce, Pr, Hf, or Tb. In some embodiments, x can be from 0 to about 1.5 in the trivalent substitution and from 0 to about 0.75 in the tetravalent substitution.

In some embodiments, the magnetodielectric hexagonal ferrite can have the composition $Sr_{1.75}Na_{0.25}Co_{1.75}M_{0.25}Fe_{12}O_{22}$. In some embodiments, the magnetodielectric hexagonal ferrite can have the composition $Sr_{1.5}Na_{0.5}Co_{1.5}M_{0.5}Fe_{12}O_{22}$.

In some embodiments, the loss factor of the magnetodielectric hexagonal ferrite can remain below 4 at frequencies up to 1 GHz. In some embodiments, the magnetodielectric hexagonal ferrite can have a permeability of between around 5 and around 6 up to 1 GHz.

Disclosed herein are embodiments of a method for incorporating additional oxides to increase the magnetic properties of a hexagonal ferrite comprising providing a Y-phase hexagonal ferrite material and incorporating an oxide consistent with the stoichiometry of $Sr_3Co_2Fe_{24}O_{41}$, $SrFe_{12}O_{19}$ or $CoFe_2O_4$ to form an enhanced hexagonal ferrite material.

In some embodiments, the Y-phase hexagonal ferrite material can include $Sr_{1.6}Na_{0.4}Co_{1.6}Sc_{0.4}Fe_{11}O_{22}$. In some embodiments, the oxide can include $CoFe_2O_4$. In some embodiments, the oxide can include $SrFe_{12}O_{19}$. In some embodiments, 2 wt. % of the oxide can be incorporated into the Y-phase hexagonal ferrite material.

In some embodiments, the enhanced hexagonal ferrite material can have a Q value of greater than about 20 at 800 MHz. In some embodiments, the enhanced hexagonal ferrite material can have a Q value of greater than about 15 at 1 GHz.

In some embodiments, the enhanced hexagonal ferrite material can have a permeability of between 6 and 8 from 800 MHz to 1 GHz. In some embodiments, the enhanced hexagonal ferrite material can have a dielectric constant of about 10-11.

Also disclosed herein are embodiments of an enhanced hexagonal ferrite having increased magnetic properties comprising a Y-phase hexagonal ferrite material, the Y-phase hexagonal ferrite material having an oxide consistent with the stoichiometry of $Sr_3Co_2Fe_{24}O_{41}$, $SrFe_{12}O_{19}$ or $CoFe_2O_4$ incorporated within.

In some embodiments, the Y-phase hexagonal ferrite material can include $Sr_{1.6}Na_{0.4}Co_{1.6}Sc_{0.4}Fe_{11}O_{22}$. In some embodiments, the oxide can include $CoFe_2O_4$. In some embodiments, the oxide can include $SrFe_{12}O_{19}$. In some embodiments, 2 wt. % of the oxide can be incorporated into the Y-phase hexagonal ferrite material.

In some embodiments, the enhanced hexagonal ferrite material can have a Q value of greater than about 20 at 800 MHz. In some embodiments, the enhanced hexagonal ferrite material can have a Q value of greater than about 15 at 1 GHz.

In some embodiments, the enhanced hexagonal ferrite material can have a permeability of between 6 and 8 from 800 MHz to 1 GHz. In some embodiments, the enhanced hexagonal ferrite material can have a dielectric constant of about 10-11.

Also disclosed herein are embodiments of a radiofrequency antenna for use in high frequency applications comprising a Y-phase hexagonal ferrite material, the Y-phase hexagonal ferrite material having an oxide consistent with the stoichiometry of $Sr_3Co_2Fe_{24}O_{41}$, $SrFe_{12}O_{19}$ or $CoFe_2O_4$ incorporated within to form an enhanced hexagonal ferrite material.

In some embodiments, the Y-phase hexagonal ferrite material can include $Sr_{1.6}Na_{0.4}Co_{1.6}Sc_{0.4}Fe_{11}O_{22}$. In some embodiments, the oxide can include $CoFe_2O_4$. In some embodiments, the oxide can include $SrFe_{12}O_{19}$. In some embodiments, 2 wt. % of the oxide can be incorporated into the Y-phase hexagonal ferrite material.

In some embodiments, the enhanced hexagonal ferrite material can have a Q value of greater than about 20 at 800 MHz. In some embodiments, the enhanced hexagonal ferrite material can have a Q value of greater than about 15 at 1 GHz.

In some embodiments, the enhanced hexagonal ferrite material can have a permeability of between 6 and 8 from 800 MHz to 1 GHz. In some embodiments, the enhanced hexagonal ferrite material can have a dielectric constant of about 10-11.

DETAILED DESCRIPTION

Figure 1:
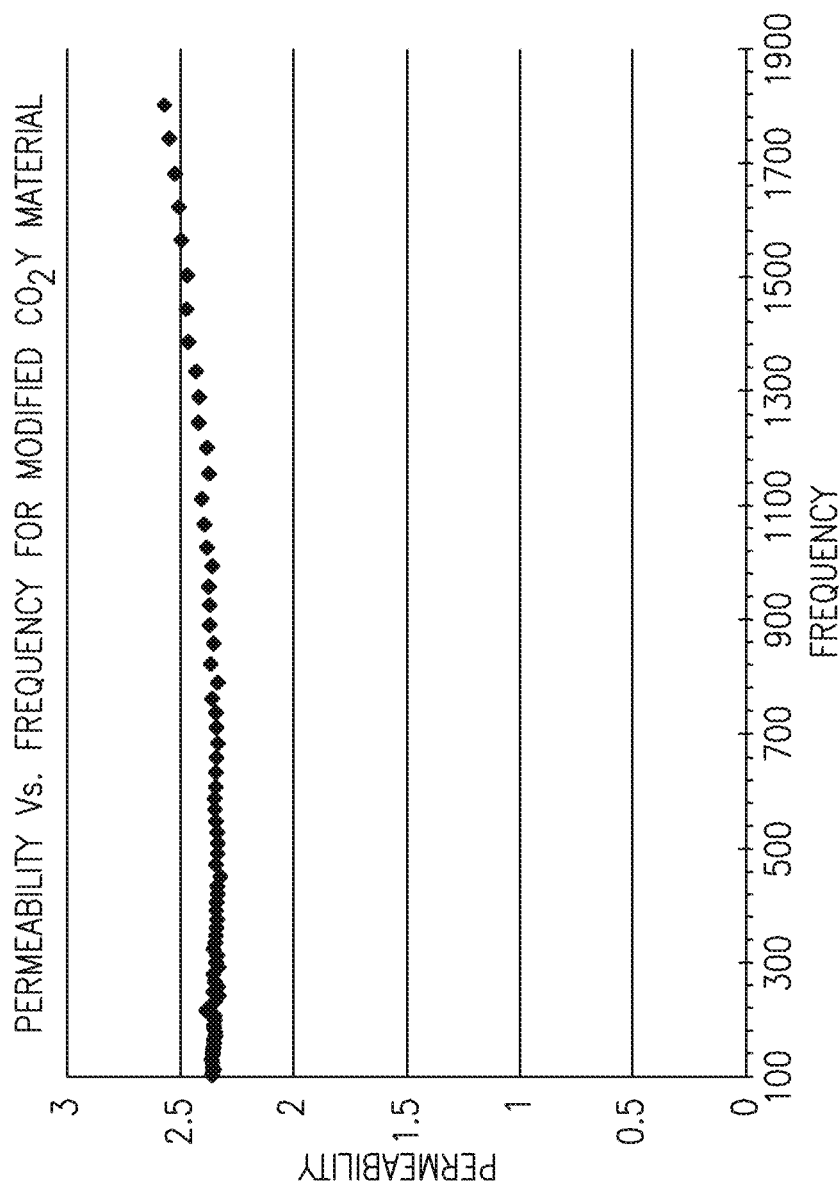
FIG. 1 illustrates permeability v. frequency for an embodiment of a Y-phase hexagonal ferrite.

Disclosed herein are embodiments of materials that can be advantageous for use as magnetodielectric materials. These magnetodielectric materials can be particularly useful in radiofrequency (RF) devices such as antennas, transformers, inductors, circulators, and absorbers because of certain favorable material properties. For example, magnetodielectric materials disclosed herein can be used at high frequency levels while maintaining good qualities, thus increasing the upper frequency limits of antennas and other devices the material is incorporated into. Additionally, some of the properties afforded by disclosed magnetodielectric materials can be favorable miniaturizing factors, reduced field concentration, and better impedance match, all of which are advantageous for radiofrequency devices. Further, as shown in FIG. 1, the permeability of embodiments of the disclosed material can remain relatively constant throughout the frequency ranges tested, thus making the material advantageous for antennas, especially those who use a variety of different frequency ranges.

Recent advances in magnetodielectric materials are driven in part by the desire to miniaturize high frequency antennas, thus reducing the overall footprint of the antenna, while maintaining desirable bandwidth, impedance, and low dielectric loss. Disclosed herein are materials and methods of making magnetodielectric materials that have improved resonant frequencies as well as low dielectric loss, thus providing for materials that are advantageous for use in, at least, radiofrequency electronics. Two figures of merit for antenna performance include the miniaturization factor and the bandwidth. First, the miniaturization factor is determined by the formula:

$$d_{eff} = d_o(\varepsilon_r \mu_r)^{-1/2}$$

where $d_{eff}/d_o$ is the miniaturization factor, $\varepsilon_r$ is the dielectric constant of the antenna material, and $\mu_r$ is the magnetic permeability of the antenna material. Both $\varepsilon_r$ and $\mu_r$ are dependent on frequency in magnetic oxide antennas. Second the effective bandwidth (or efficiency) is determined by the formula:

$$\eta = \eta_o(\mu_r/\varepsilon_r)^{1/2}$$

where $\eta/\eta_o$ describes the efficiency (or bandwidth) of the material. This efficiency is maximized if $\mu_r$ is maximized. In addition if $\mu_r = \varepsilon_r$ there is a perfect impedance match to free space.

Hexagonal Ferrite

One class of materials that can have advantageous magnetic properties for magnetodielectric applications are hexagonal ferrites. Hexagonal ferrites, or hexaferrites, have magnetic properties that can be directly linked to their crystal structure. For example, hexagonal ferrites all have magnetocrystalline anisotropy, where the response to an induced magnetic field has a preferred orientation through the crystal structure. Additionally, hexagonal ferrite systems, in particular, can be desirable because of their high magnetic permeability and absorption at microwave (100 MHz-20 GHz) frequencies, which are useful antenna frequencies.

Figure 2:
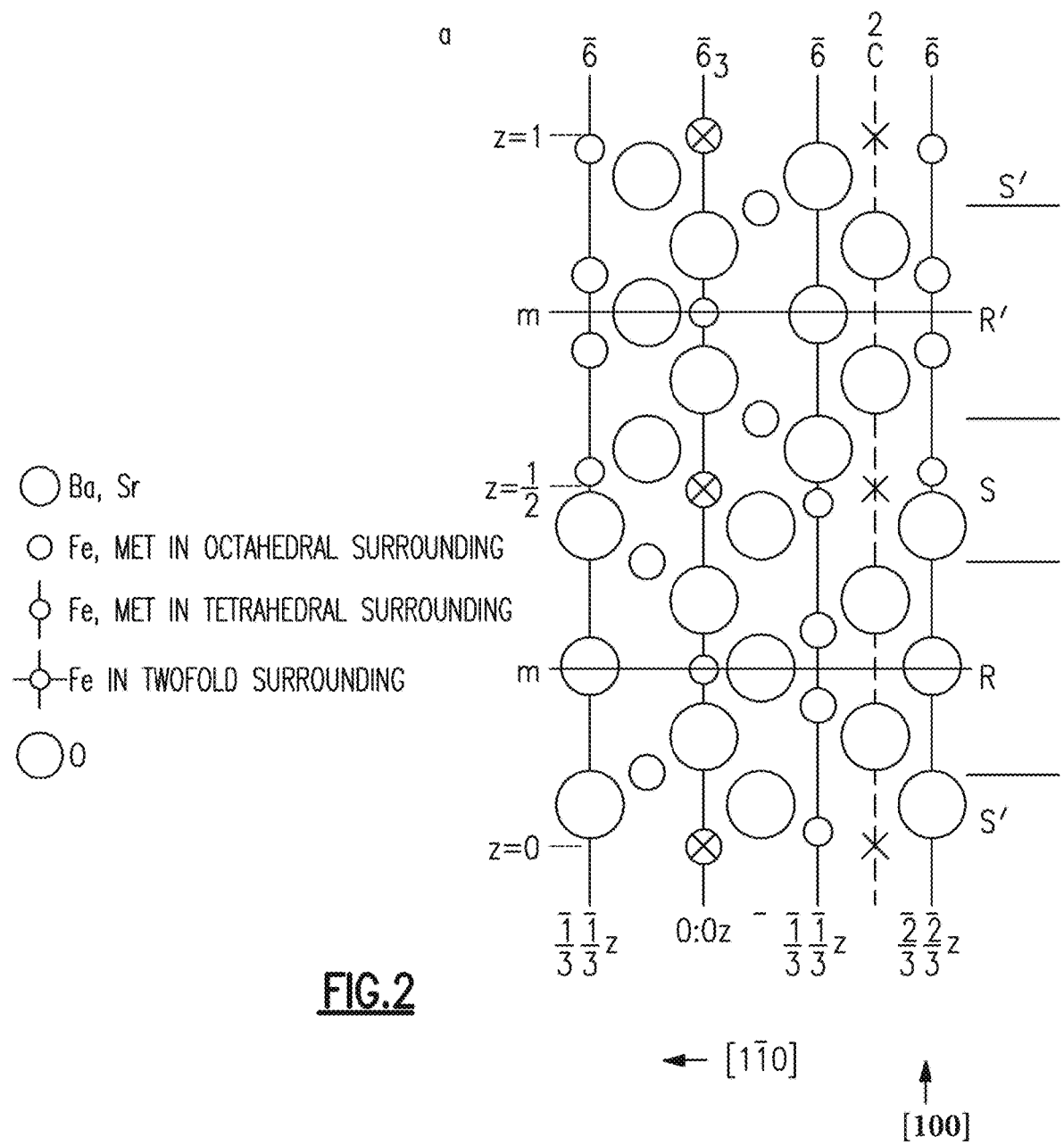
FIG. 2 illustrates the crystal structure of an embodiment of a Y-phase hexagonal ferrite.

Hexagonal ferrite crystal systems can include crystal structures that are generally intergrowths between magnetoplumbite and spinel structures containing strontium (Sr) or barium (Ba), a divalent cation such as iron (Fe), cobalt (Co), nickel (Ni) or manganese (Mn) and trivalent Fe. The hexagonal ferrite may be formed in a variety of different crystal structures based on the magnetoplumbite cell. These structures include M-phase ($SrFe_{12}O_{19}$), W-phase ($BaMe_2Fe_{16}O_{27}$), Y-phase ($Sr_2Me_2Fe_{12}O_{22}$) and Z-phase ($Ba_3Me_2Fe_{24}O_{42}$), as well as combinations of the structures. FIG. 2 illustrates the crystal structure of Y-phase hexagonal ferrite.

While typical hexagonal ferrites contain barium, the barium atoms can be substituted out for an atom of a similar size, such as strontium. Accordingly, the substitution of the barium atoms with strontium atoms should not negatively impact the properties of the material as the structure should retain generally the same shape. In fact, as shown below, the use of strontium instead of barium can allow for other processing methods that improve the magnetodielectric properties of the hexagonal ferrite.

One example hexagonal ferrite that can be particularly advantageous as a magnetodielectric material for use in, for example, high frequency antennas or other RF devices, is Y-phase strontium cobalt ferrite ($Sr_2Co_2Fe_{12}O_{22}$), commonly abbreviated as $Co_2Y$. Disclosed herein are embodiments of this a class of Y-phase hexagonal ferrites, as well as methods of manufacturing them, having improved magnetic properties useful for RF applications, such as improved resonant frequencies, low magnetic loss, and high Q factor values.

Embodiments of the present disclosure, teach methods and processing techniques for improving performance characteristics of hexagonal ferrite materials used in high frequency applications. Certain embodiments provide improved methods and processing techniques for manufacturing Y-phase hexagonal ferrite systems $Sr_2Co_2Fe_{12}O_{22}$ ($Co_2Y$) that have reduced magnetostriction, improved resonant frequency, and extended magnetic permeability at higher frequencies.

Magnetodielectric Properties

Certain properties of a material can be advantageous for use in magnetodielectric applications, such as radio frequency antennas. These properties include, but are not limited to, magnetic permeability, permittivity, magnetic anisotropy, magnetic loss, and magnetic Q values.

Permeability is the measure of the ability of a material to support the formation of a magnetic field within itself. In other words, magnetic permeability is the degree of magnetization that a material obtains in response to an applied magnetic field. Accordingly, a higher magnetic permeability, or mu' or p', allows for a material to support a higher magnetic field. Accordingly, it can be advantageous to have high magnetic permeability for use with radio frequency applications.

Relative permeability and relative permittivity are properties indicative of the performance of a magnetic material in high frequency antenna applications. Relative permeability is a measure of the degree of magnetization of a material that responds linearly to an applied magnetic field relative to that of free space ($\mu_r=\mu/\mu_o$). Relative permittivity ($\varepsilon_r$) is a relative measure of the electronic polarizability of a material relative to the polarizability of free space ($\varepsilon_r=\varepsilon/\varepsilon_o$). Generally, permeability ($\mu'$) can be separated into two components: spin rotational $X_{sp}$ which is in response for high frequency, and domain wall motion $X_{dw}$ which is damped out at microwave frequencies. Permeability can be generally represented by $\mu'=1+X_{dw}+X_{sp}$.

Unlike spinels, $Co_2Y$ systems typically have a non-cubic unit cell, planar magnetization, and an anisotropic spin-rotation component to permeability. Spin rotation anisotropy is also a consideration in preparing $Co_2Y$ for high frequency applications. Large anisotropy fields ($H_\theta$) are similar to applying an external magnetic field which increases resonant frequency, whereas small anisotropy fields ($H_\varphi$) improve permeability. $H_\theta$ is generally strong in hexagonal ferrites, such as $Co_2Y$. As such, domain formation out of the basal plane is suppressed and the material becomes self-magnetizing. The relationship between the permeability and the rotational stiffness can be represented by the formula ($\mu_o-1$)/$4\pi$=($\frac{1}{3}$)($M_s/H_\varphi^A+M_s/H_\varphi^A$). For isotropic rotational stiffness (as in spinels), the relationship can be represented as follows: ($\mu_o-1$)/$4\pi$=($\frac{2}{3}$)($M_s/H^A$). For cases where $H_\theta^A$ does not equal to $H_\varphi^A$: $f_{res}$ ($\mu_o-1$)=4/3 $\psi M_s$ [½ ($H_\theta^A/H_\varphi^A$)+½ ($H_\varphi^A/H_\theta^A$)]. It is believed that the larger the difference in rotational stiffness, the greater the self-magnetization field, which could push the resonant frequency into the microwave region. Permeability drops quickly above the resonance frequency.

Another property of magnetodielectric antenna materials is the magnetic loss factor. The magnetic loss tangent describes the ability of the magnetic response in a material to be in phase with the frequency of the applied magnetic field (in this case from electromagnetic radiation) at a certain frequency. This is represented as tan $\delta_m=\mu''/\mu'$. The Magnetic Q is the inverse of the magnetic loss tangent. Q=1/tan $\delta_m$. For example, if a loss factor is high at a certain frequency, the material would not be able to operate at that frequency. Accordingly, it can be advantageous for a magnetodielectric material to have low magnetic loss tangent up to higher frequencies, such as those above 500 MHz, above 800 MHz, or above 1 GHz, as the material could then be used in applications at those high frequencies. Magnetic Q factors of above 20 are advantageous for some applications. This can be especially useful for antennas to select particular high frequency signals without interference from other signals at around the selected range.

Substitution with Potassium (K)

In some embodiments, improvements to hexagonal ferrite material can be made by substituting potassium (K) into the crystal structure of the Y-phase hexagonal ferrite material. This incorporation can be done with, or without, the other methods for improving magnetic properties discussed through the disclosure.

In order to increase the resonant frequency of a material, such as the Y-phase hexagonal ferrite, small amounts of alkali metals can be doped into the composition. For example, lithium, sodium, potassium, and rubidium can all be doped into the hexagonal ferrite. In doing so, strontium atoms can be substituted out to make room for the alkali metals. This addition of alkali metal, can prevent the reduction of iron to the $Fe^{2+}$ state. Since the alkali metal with a 1+ oxidation state substitutes for Sr with a 2+ oxidation state, it decreases the likelihood of $Fe^{3+}$ converting to $Fe^{2+}$ because, in this case, the average metal oxidation state becomes too low. Therefore, the reduction of iron during sintering is inhibited. By avoiding the reduction of iron, the threshold for the resonant frequency can be pushed higher than values that have been previously obtained. $Fe^{2+}$ decreases the resonant frequency and contributes to both the magnetic and the dielectric loss tangents. Accordingly, the increased resonant frequency, along with the decreased magnetic loss tangent, can then result in a corresponding increase in the magnetic Q factor, allowing for embodiments of the disclosed material to have advantageous uses as a magnetodielectric material.

In some embodiments, potassium (K) may be added as an excess material to $Sr_2Co_2Fe_{12}O_{22}$ in, for example, the form of potassium carbonate. However, other potassium sources can be used as well, and the particular potassium composition is not limiting. Further, in some embodiments the potassium can be substituted into the strontium site on the crystal structure. Potassium carbonate can be added into the structure with the oxide blend in modest amounts and can become incorporated into the structure, for example during a heat treatment of the material.

Strontium and potassium have different charges to their atoms, 2+ for strontium and 1+ for potassium (or sodium) and thus some charge balancing can be used to avoid any significant or harmful distortion of the crystal structure of the Y-phase hexagonal ferrite. In some embodiments, a trivalent or tetravalent species can be substituted in for cobalt (having a 2+ charge, similar to the strontium), which can compensate for the charge imbalance that occurs by substituting $K^+$ in for $Sr^{2+}$, thus leading to a generally balanced chemical structure. Due to the ability to provide charge balancing, two series of compounds can be used, one for trivalent ion substitutions for cobalt and one for tetravalent ion substitutions of cobalt.

For trivalent ion substitution, the below example composition can be used in certain embodiments:

$$Sr_{2-x}K_xCo_{2-x}M_xFe_{12}O_{22}$$

where M can be any trivalent ion. For example, M can be Sc, Mn, In, Cr, Ga, Co, Ni, Fe, Yb, Er, Y or any of the lanthanide ions, and the particular element is not limiting. Further, x values can be in the range of about 0 to about 1.5. In some embodiments, 0.2<x<0.7.

For tetravalent ion substitution, the below example composition can be used in certain embodiments:

$$Sr_{2-2x}K_{2x}Co_{2-x}N_xFe_{12}O_{22}$$

where N can be any tetravalent ion. For example, N can be Si, Ge, Ti, Zr, Sn, Ce, Pr, Hf, or Tb, and the particular element is not limiting. Again, in some embodiments x values can be in the range of about 0 to 0.75. In some embodiments, 0.2<x<0.5.

Figure 3:
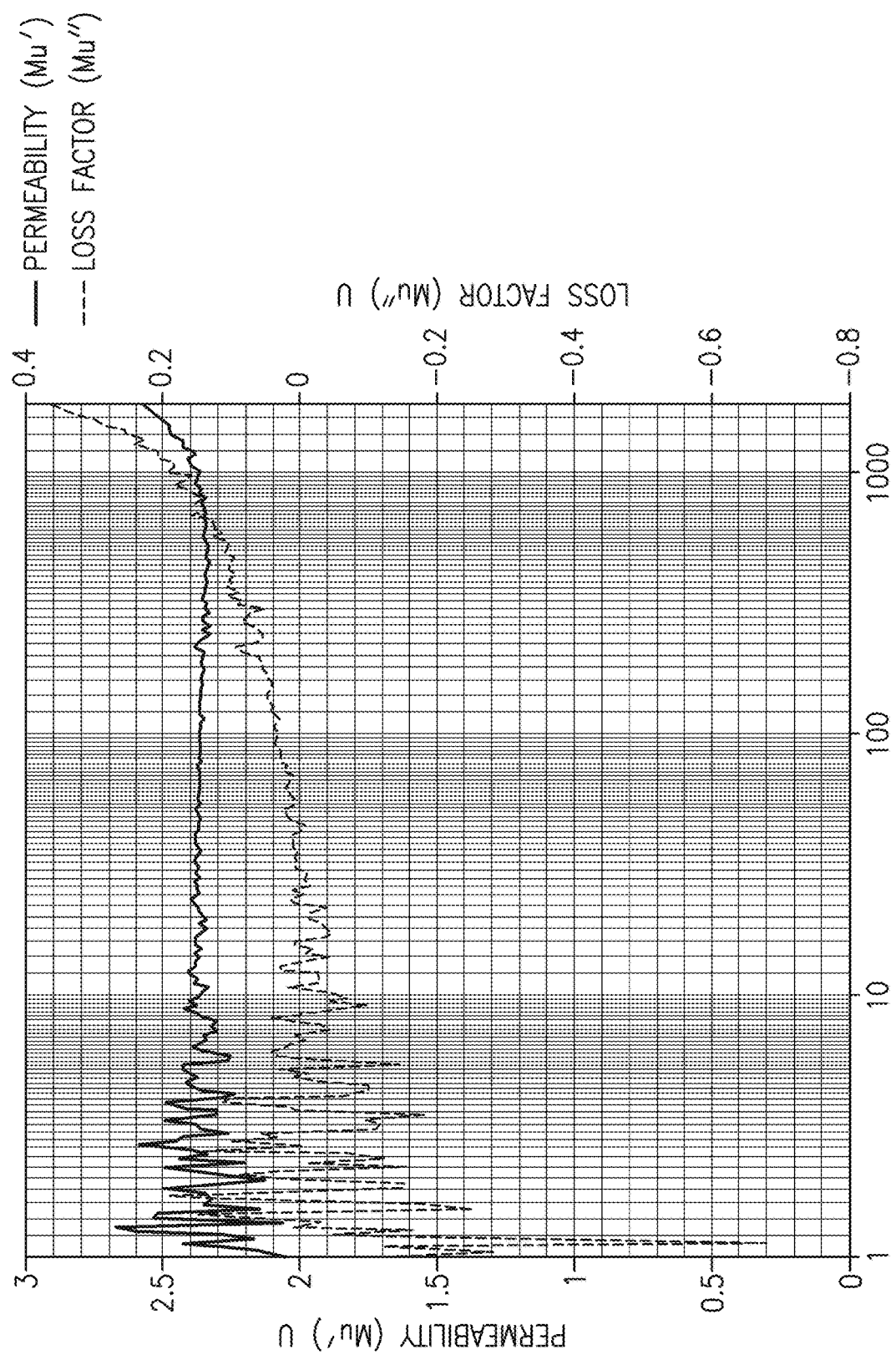
FIG. 3 illustrates permeability and loss factor based on frequency for an embodiment of Y-phase hexagonal ferrite without potassium carbonate.
Figure 4:
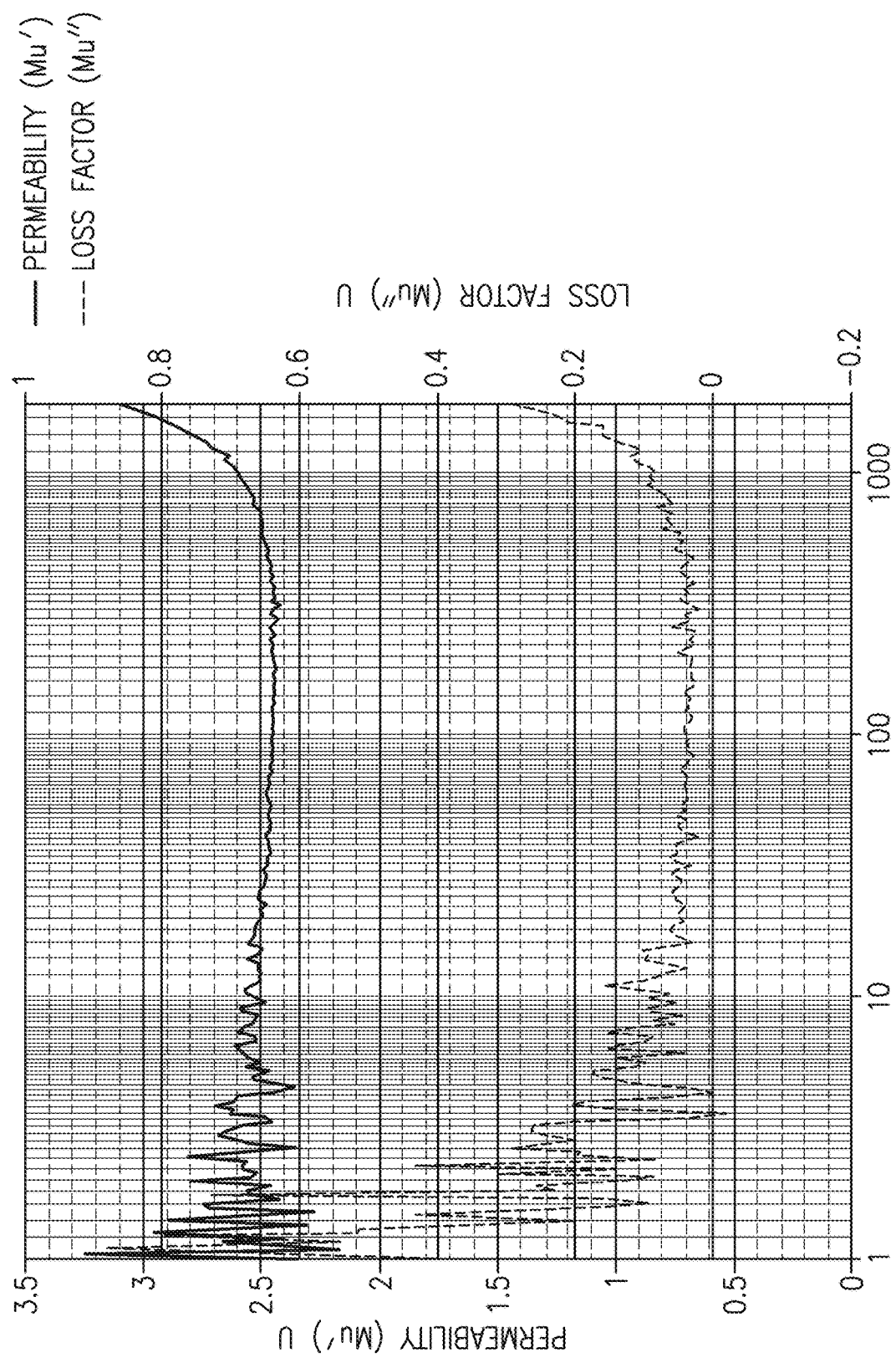
FIG. 4 illustrates permeability and loss factor based on frequency for an embodiment of Y-phase hexagonal ferrite with potassium carbonate.

FIGS. 3-4 show impedance spectra using the above disclosed substitution technique of adding potassium carbonate. Typically, the impedance spectra is performed using dielectric spectroscopy, also known as impedance spectroscopy or electrochemical impedance spectroscopy. The impedance spectra can advantageously show the different dielectric properties of a medium as a function of different frequencies.

In FIGS. 3-4, the impedance spectra shows both permeability (μ') as well as loss factor (μ") across a range of frequencies. It can be advantageous for magnetodielectric materials used in radio frequency applications to have a minimal change in properties across the range of frequencies, and in particular a minimal μ", and therefore a minimal loss tangent, at those particular frequencies. When the loss tangent begins to increase or spike, the material may become unsuitable for antenna applications using that particular range of frequencies.

Along with minimizing the loss tangent spike, it can be advantageous to adjust the spike (or quick increase) in loss tangent to as high a frequency as possible. As mentioned, when the loss tangent spikes, the material may become less useful at those particular frequencies. So having a loss tangent spike at higher frequencies can generally mean that the material can be used at higher frequencies (up until the spike) with minimized loss.

In particular, FIG. 3 illustrates the permeability without the incorporation of potassium carbonate. Accordingly, the composition is pure sintered $Sr_2Co_2Fe_{12}O_{22}$ without the use of potassium carbonate.

As shown in FIG. 3, the μ" (loss factor) of the material can vary wildly at low frequencies. Further, as the frequency increases, μ" steadily increases (after reducing much of the variation of the lower frequencies) until it begins a generally exponential growth.

On the other hand, FIG. 4 illustrates the permeability and loss factor for a $Sr_2Co_2Fe_{12}O_{22}$ wherein potassium carbonate is added in.

As shown in FIG. 4, the loss factor of an embodiment of the Y-phase hexagonal ferrite material can be lower than the one shown in FIG. 3. Further, the loss factor shown in FIG. 4 actually decreases as the frequency increases up to a certain point, such as between 1 and 10 MHz. In the ranges of around 100 MHz to about 800 MHz, the loss factor remains relatively stable at about 0.7, before increasing. However, even at the higher frequency of 1 GHz, the material still has a loss factor of only around 1. Looking back at the previous FIG. 3 without potassium carbonate, it is clearly shown that the potassium carbonate addition greatly reduces the loss factor of the Y-phase hexagonal ferrite material, making it advantageous for high frequency radiofrequency applications.

Further, FIG. 1 shows a graph of permeability v. frequency for an embodiment of the disclosed material without the incorporation of potassium carbonate. As shown in FIG. 1, the permeability of the material remains relatively constant throughout the frequency ranges tested. Generally, the permeability of the material remains just under 2.5, though there is some minor increase as the tested frequency increases. The permeability increases to over 2.5 at approximately 160 MHz.

Figure 5:
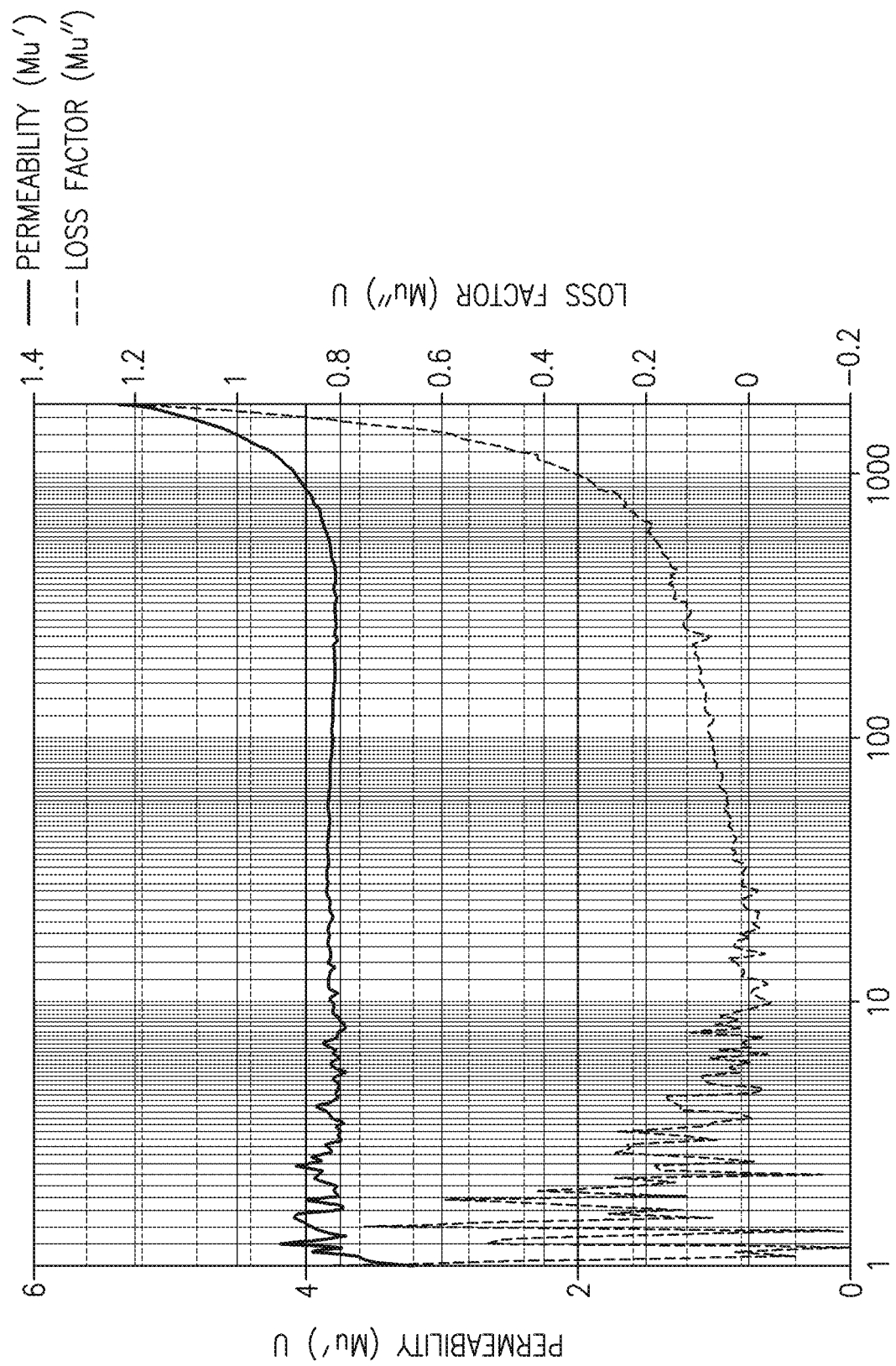
FIG. 5 illustrates permeability and loss factor based on frequency for an embodiment of Y-phase hexagonal ferrite having scandium and incorporating 0.25 wt. % potassium.

FIG. 5 illustrates the permeability and loss factor for a hexagonal ferrite material discussed above with a trivalent substitution where M is Sc and where x=0.25.

As shown in FIG. 5, the μ" (loss factor) of an embodiment of the Y-phase hexagonal ferrite material is extremely low, reaching to almost 0. Even as the frequency increases to over 1 GHz, the material maintains loss factors of below 0.5. While maintaining the low loss factor, the material shown in FIG. 5 also contains a permeability of around 4.

Further, while maintaining the low loss factor, the material shown in FIG. 5 also contains a permeability of over 3, which is greater than the typical values for Y-phase hexagonal ferrite materials, and thus can provide the material with advantageous properties.

Accordingly, because of the low loss factor and the high magnetic permeability, embodiments of the Y-phase hexagonal ferrite material discussed above can be advantageous for use as a magnetodielectric material, such as in a radio frequency antennas or other high frequency applications.

Figure 6:
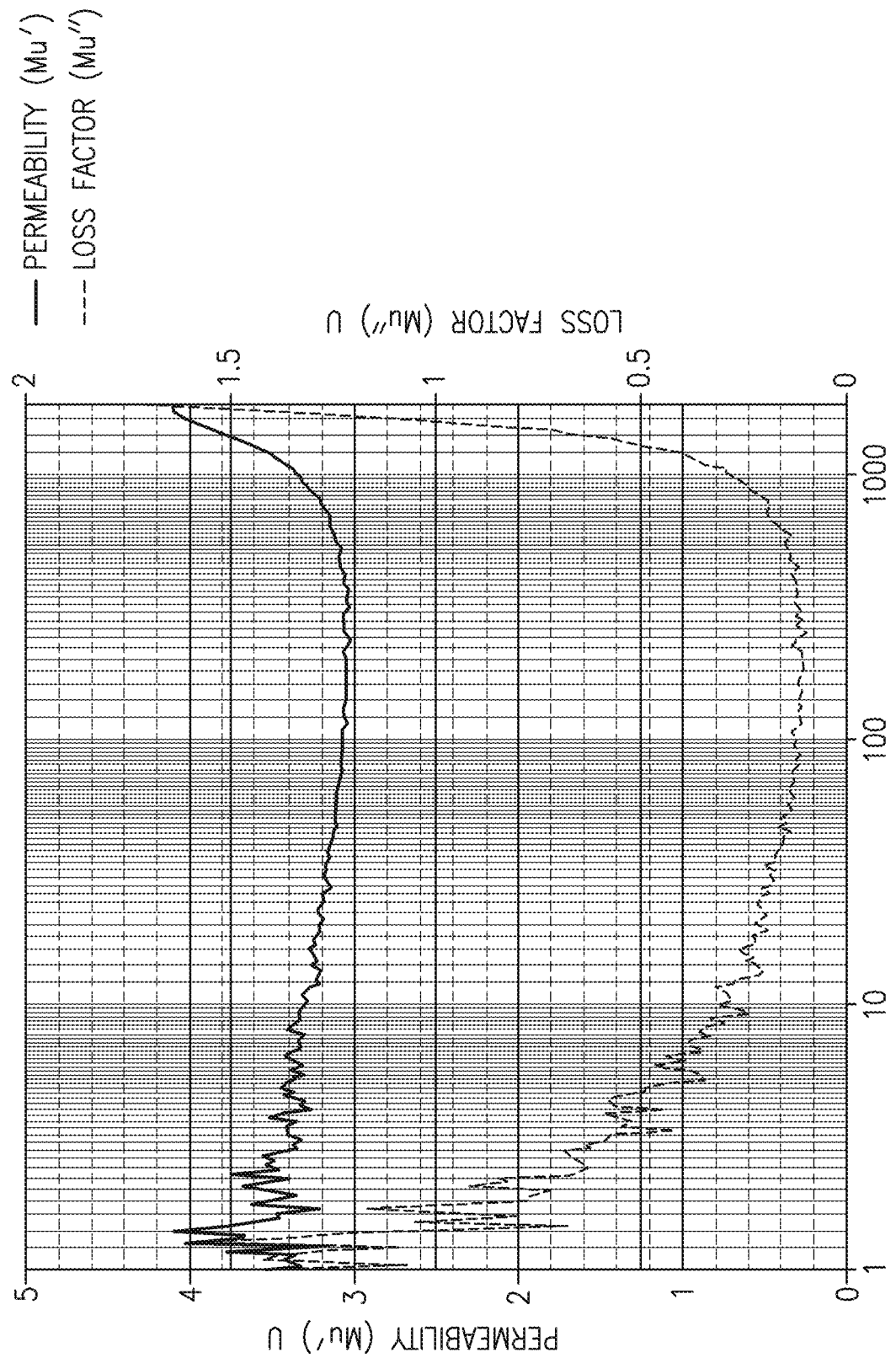
FIG. 6 illustrates permeability and loss factor based on frequency for an embodiment of Y-phase hexagonal ferrite having indium and incorporating 0.25 wt. % potassium.

FIG. 6 illustrates the permeability and loss factor for a hexagonal ferrite material discussed above with a trivalent substitution where M is In and where x=0.25.

As shown in FIG. 6, the loss factor of an embodiment of the Y-phase hexagonal ferrite material is extremely low, reaching almost to 0. Even as the frequency increases to over 1 GHz, the material maintains a loss factor of below 0.5. It is not until over 1 GHz that the loss factor of the material begins to spike, and as shown the increase can be significant after 1 GHz.

Further, while maintaining the low loss factor, the material shown in FIG. 6 also contains a permeability of over 3 (staying around 3.5), which is greater than the typical values for Y-phase hexagonal ferrite materials, and thus can provide the material with advantageous properties.

Accordingly, because of the low loss factor and the high magnetic permeability, embodiments of the Y-phase hexagonal ferrite material shown with respect to FIG. 6 can be advantageous for use as a magnetodielectric material, such as in a radio frequency antenna or other high frequency applications.

Figure 7:
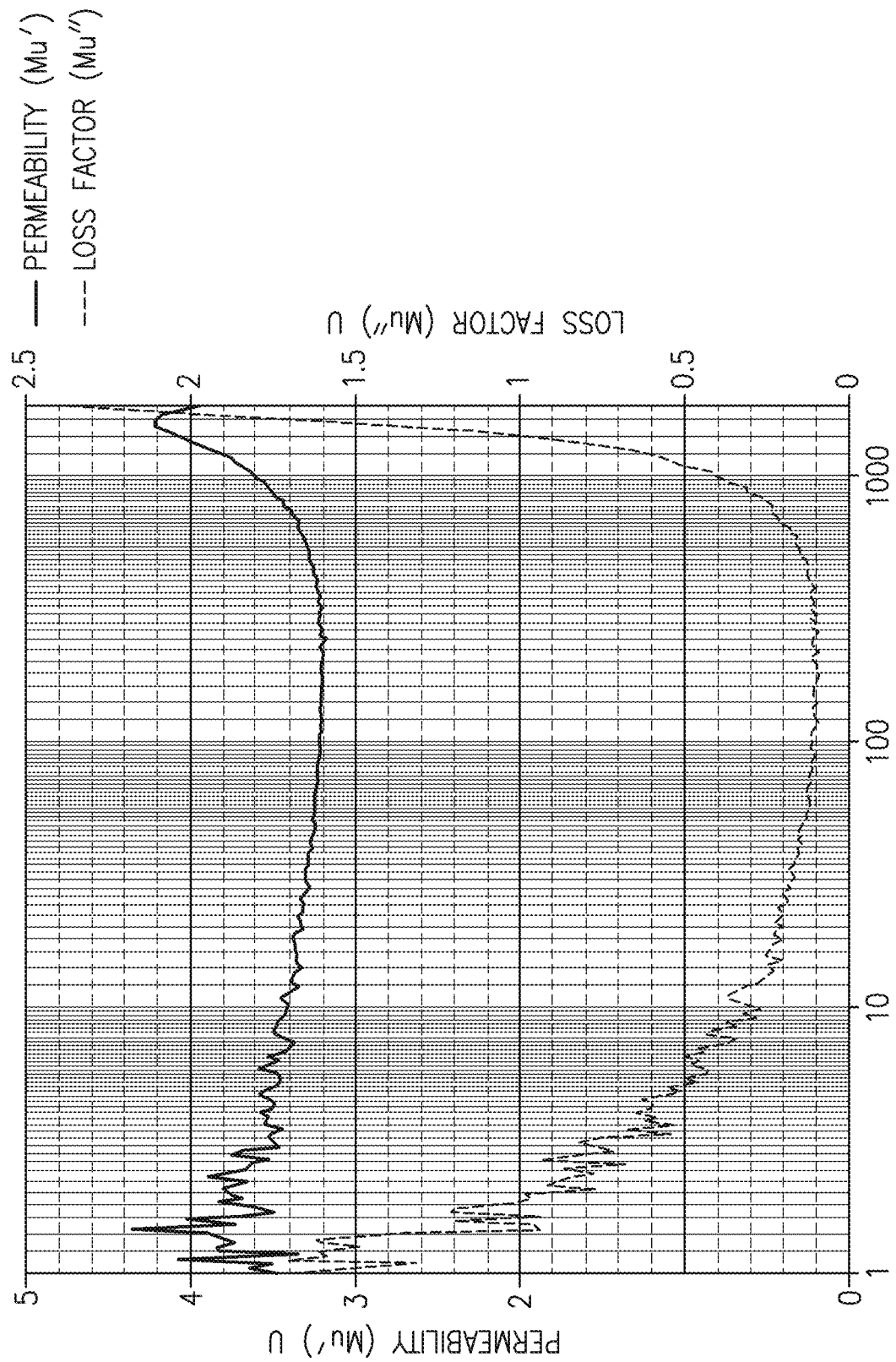
FIG. 7 illustrates permeability and loss factor based on frequency for an embodiment of Y-phase hexagonal ferrite having scandium and incorporating 0.5 wt. % potassium.

FIG. 7 illustrates the permeability and loss factor for a hexagonal ferrite material having trivalent substitution where M is Sc and where x=0.5.

As shown in FIG. 7, the loss factor of an embodiment of the Y-phase hexagonal ferrite material is extremely low, reaching almost to 0. Even as the frequency increases to over 1 GHz, the material maintains loss factors of below 1. It is not until over 1 GHz that the loss factor of the material begins to spike, and as shown the increase can be significant after 1 GHz.

Further, while maintaining the low loss factor, the material shown in FIG. 7 also contains a permeability of about 3 to about 4, which is greater than the typical for a Y-phase hexagonal ferrite material.

Accordingly, because of the low loss factor and the high magnetic permeability, embodiments of the Y-phase hexagonal ferrite material shown with respect to FIG. 7 can be advantageous for use as a magnetodielectric material, such as in a radio frequency antenna or other high frequency applications.

Figure 8:
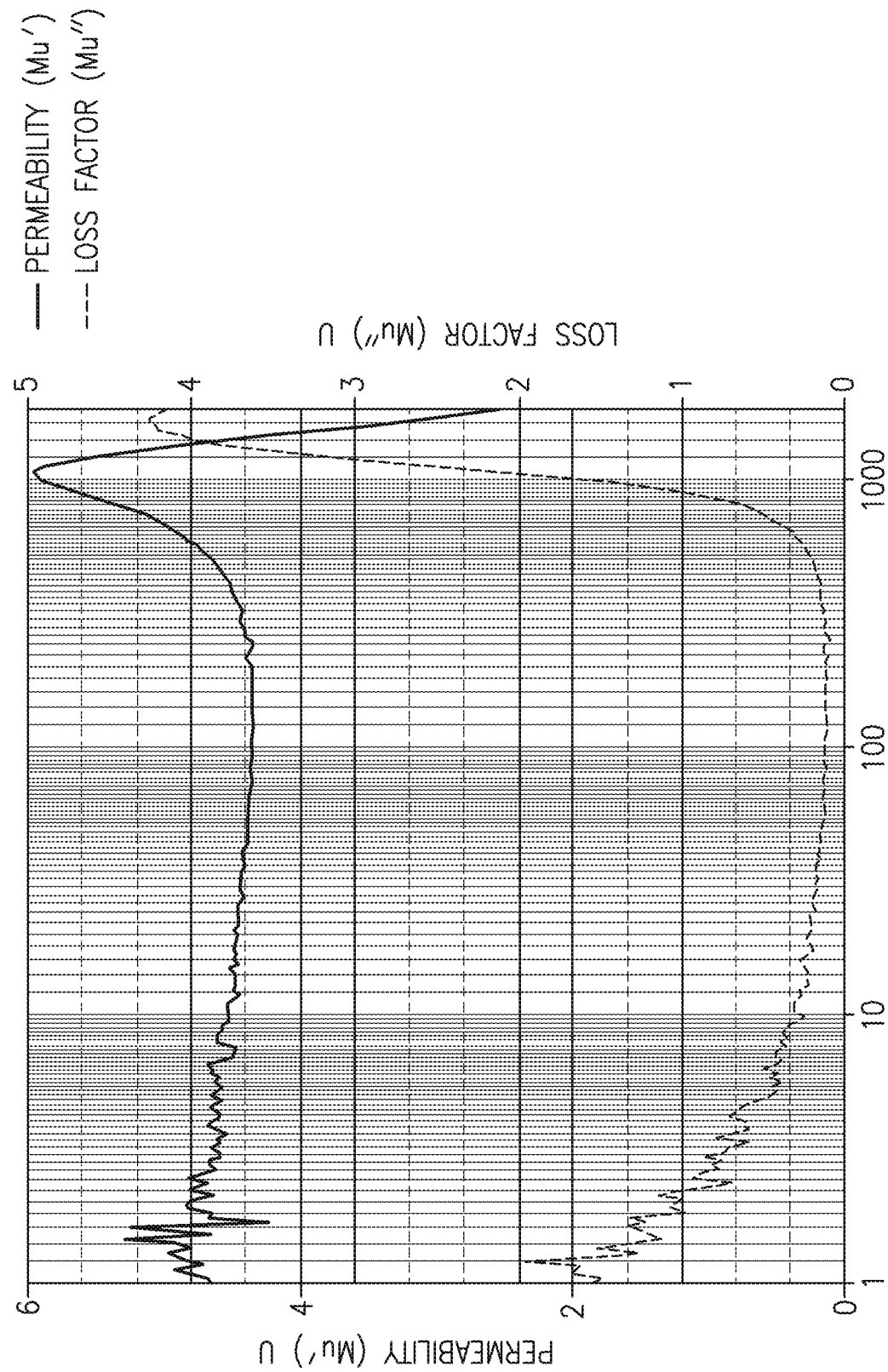
FIG. 8 illustrates permeability and loss factor based on frequency for an embodiment of Y-phase hexagonal ferrite having indium and incorporating 0.5 wt. % potassium.

FIG. 8 illustrates the permeability and loss factor for a hexagonal ferrite material having trivalent substitution where M is In and where x=0.5.

As shown in FIG. 8, the loss factor of an embodiment of the Y-phase hexagonal ferrite material is again extremely low, though slightly above the other figures described above. The loss factor reduces greatly to near 0 from about 100 MHz to about 800 MHz, when the loss factor starts increasing. However, even with the increase, the Y-phase hexagonal ferrite material maintains a loss factor of about 2 at 1 GHz.

Further, while maintaining the low loss factor, the material shown in FIG. 8 also contains a permeability of greater than 4, from about 4-5, which is over double that of standard Y-phase hexagonal ferrite materials. Moreover, it is noticeable that there is a large spike in permeability at around 1 GHz, where permeability increases to about 6. Therefore, at 1 GHz, embodiments of the material have a large permeability while still maintaining the relatively low loss factor.

Accordingly, because of the low loss factor and the high magnetic permeability, embodiments of the Y-phase hexagonal ferrite material shown with respect to FIG. 8 can be advantageous for use as a magnetodielectric material, such as in a radio frequency antenna or other high frequency applications.

Substitution with Sodium (Na)

While the disclosure above shows one method for improving the magnetic properties of a Y-phase hexagonal ferrite materials, different improvements can be made into the hexagonal ferrite material by substituting sodium into the crystal structure of the Y-phase hexagonal ferrite material. This incorporation can be done with, or without, the other methods for improving magnetic properties discussed throughout the application.

In order to increase the resonant frequency of a material, such as the Y-phase hexagonal ferrite, small amounts of alkali metals can be doped into the composition. For example, lithium, sodium, potassium, and rubidium can all be doped into the hexagonal ferrite. In doing so, strontium atoms can be substituted out to make room for the alkali metals. This addition of alkali metal, can prevent the reduction of iron to the $Fe^{2+}$ state. Since the alkali metal with a 1+ oxidation state substitutes for Sr with a 2+ oxidation state, it decreases the likelihood of $Fe^{3+}$ converting to $Fe^{2+}$ because, in this case, the average metal oxidation state becomes too low. Therefore, the reduction of iron during sintering is inhibited. By avoiding the reduction of iron, the threshold for the resonant frequency can be pushed higher than values that have been previously obtained. $Fe^{2+}$ decreases the resonant frequency and contributes to both the magnetic and the dielectric loss tangents. Accordingly, the increased resonant frequency, along with the decreased magnetic loss tangent, can then result in a corresponding increase in the magnetic Q factor, allowing for embodiments of the disclosed material to have advantageous uses as a magnetodielectric material.

In some embodiments, sodium (Na) can be used as an atom to substitute into the crystal structure of the Y-phase strontium hexagonal ferrite. By incorporating sodium into the crystal structure, high magnetic permeability values can be achieved while maintaining high Q values, thus improving embodiments of the material for use as a magnetodielectric material.

In some embodiments, $Na^+$ can be used to substitute out some of the $Sr^{2+}$ atoms in the Y-phase hexagonal ferrite. The substitution can be performed through numerous methods, and can include numerous compositions having sodium, and the method of substitution is not limiting. For example, in some embodiments the substitution of strontium for sodium can be performed without charge compensation elsewhere in the lattice or with charge compensation through a coupled substitution in the Sr—Co—Y lattice.

However, strontium and sodium have different charges to their atoms, 2 for strontium and 1 for sodium, and thus some charge balancing can be used to avoid significant distortion of any crystal structure. In some embodiments, a trivalent or tetravalent species can be substituted in for cobalt (having a 2+ charge, similar to strontium), which can compensate for the charge imbalance that occurs by substituting $Na^+$ in for $Sr^{2+}$, thus leading to a generally balanced chemical structure. Due to the ability to provide charge balancing, two series of compounds can be used, one for trivalent ion substitutions of cobalt and one for tetravalent ion substitutions of cobalt.

For trivalent ion substitution, the below example composition can be used:

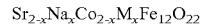

$$Sr_{2-x}Na_xCo_{2-x}M_xFe_{12}O_{22}$$

where M is a trivalent cation such as Al, Ga, Sc, Cr, Mn, In, Yb, Er, Y or other lanthanide, though the trivalent ion is not limiting. Further, x values can be in the range of about 0 to about 1.5. In some embodiments, 0.2<x<0.7.

For tetravalent ion substitution, the below equation can be used:

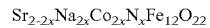

$$Sr_{2-2x}Na_{2x}Co_{2x}N_xFe_{12}O_{22}$$

where N can be Si, Ge, Ti, Zr, Sn, Ce, Pr, Hf, or Tb, though the tetravalent ion is not limiting. Further, x values can be in the range of about 0 to about 1.5. In some embodiments, 0.2<x<0.7. In some embodiments where x=0.4, very high permeability values at low loss are also observed.

Figure 9:
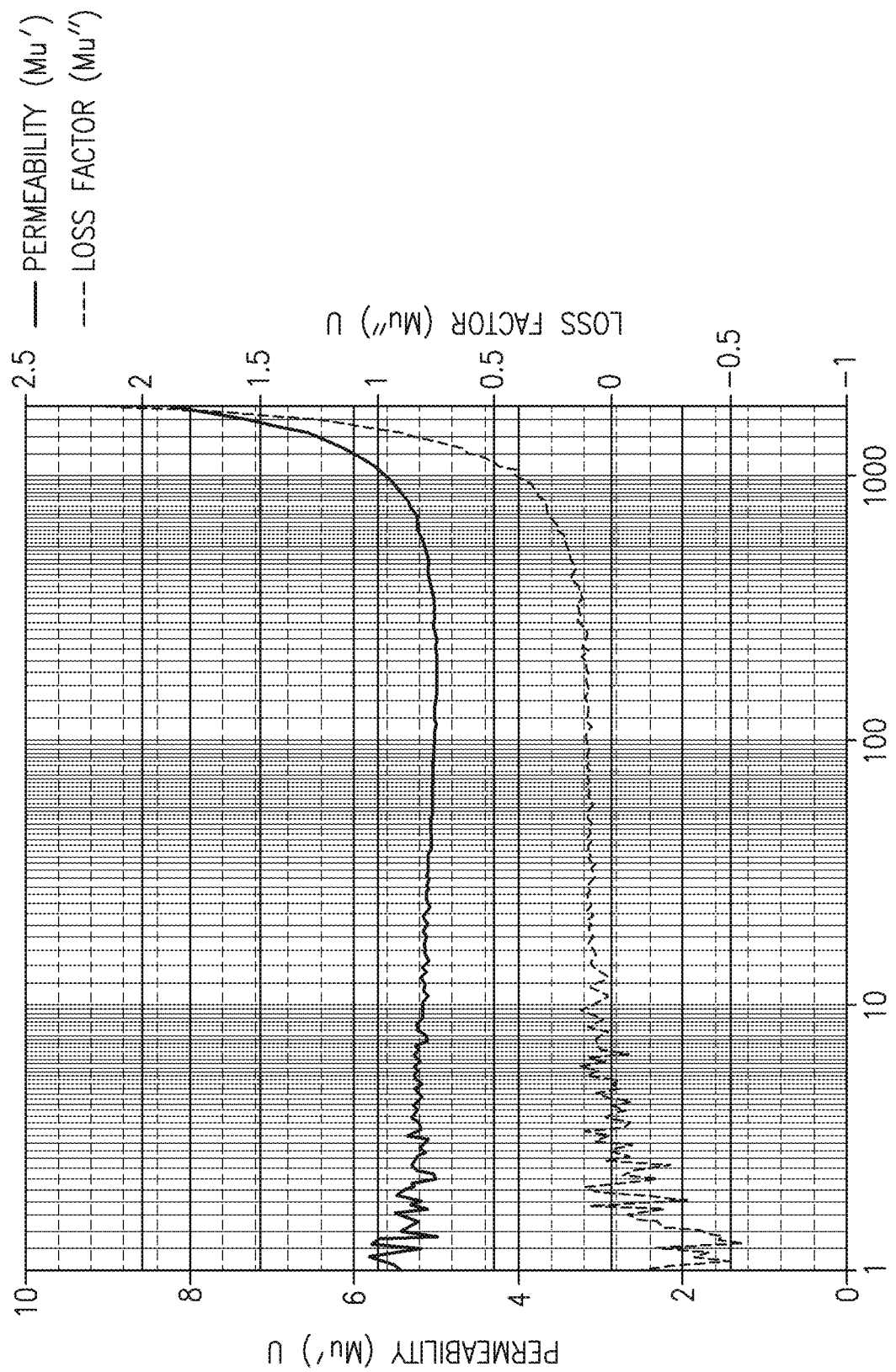
FIG. 9 illustrates permeability and loss factor based on frequency for an embodiment of Y-phase hexagonal ferrite having scandium and incorporating 0.25 wt. % sodium.
Figure 10:
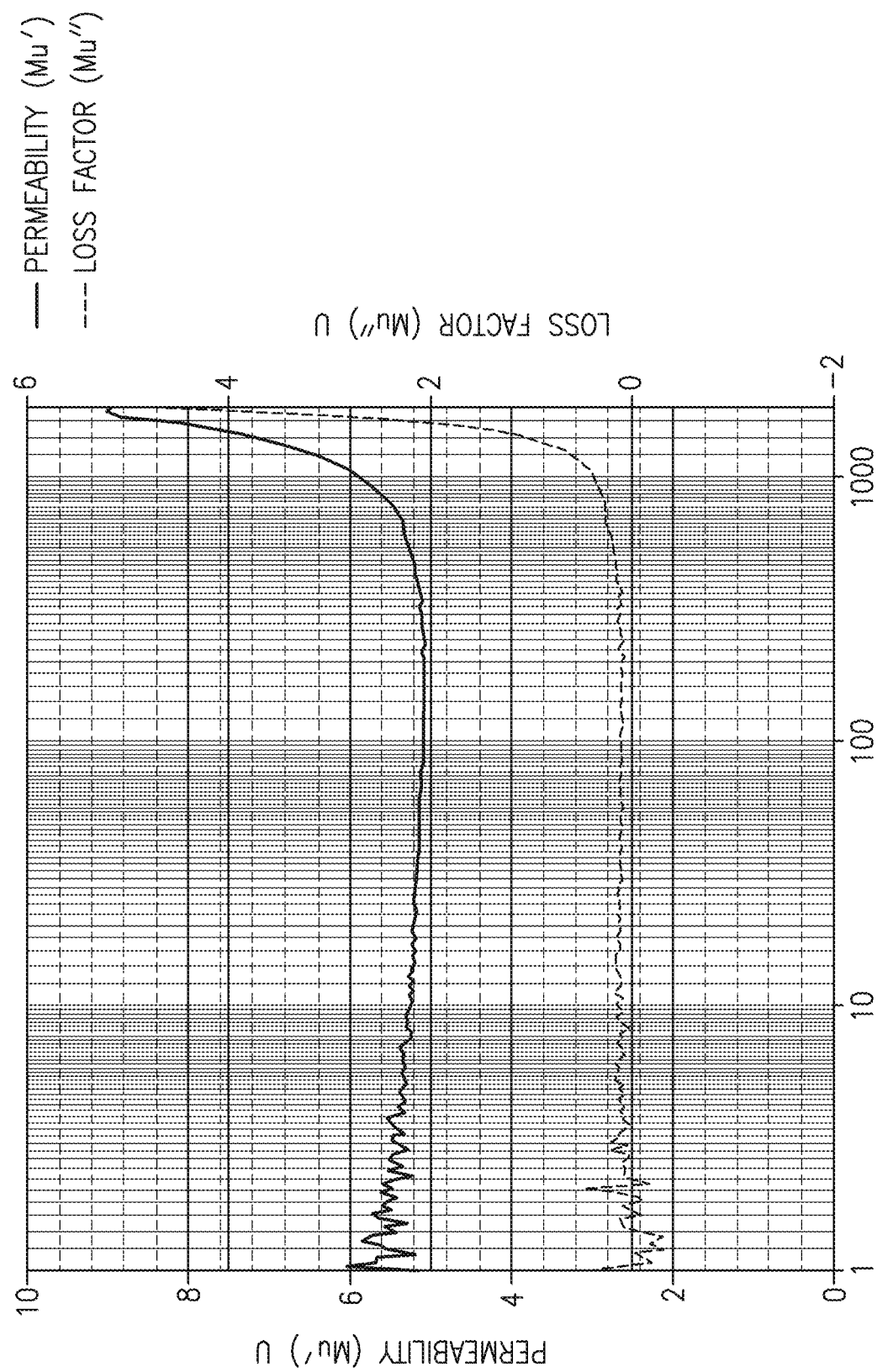
FIG. 10 illustrates permeability and loss factor based on frequency for an embodiment of Y-phase hexagonal ferrite having scandium and incorporating 0.5 wt. % sodium.

FIGS. 9-10 show impedance spectra using the above disclosed substitution technique. Typically, the impedance spectra is performed using dielectric spectroscopy, also known as impedance spectroscopy or electrochemical impedance spectroscopy. The impedance spectra can advantageously show the different dielectric properties of a medium as a function of different frequencies.

In FIGS. 9-10, the impedance spectra shows both permeability (μ') as well as loss factor (μ") across a range of frequencies. It can be advantageous for radio frequency applications to have minimal movement across the range of frequencies, which shows that there is minimal loss at those particular frequencies. When the loss factor begins to spike, the material may experience more loss during use at those frequencies. At a certain point, the material may become unusable for antenna applications at that particular range of frequencies due to the high loss.

Along with minimizing the loss factor spike, it can be advantageous to adjust the spike in loss factor as far towards the high range of frequency as possible. As mentioned, when the loss factor spikes, the material may become less useful in those particular frequencies. So having a loss factor spike at higher frequencies can generally mean that the material can be used at higher frequencies with minimized loss.

FIG. 9 illustrates the permeability and loss factor for a hexagonal ferrite material using Sc where x=0.25. Accordingly, the general equation is $Sr_{1.75}Na_{0.25}Co_{1.75}Sc_{0.25}Fe_{12}O_{22}$.

As shown in FIG. 9, the loss factor of an embodiment of the Y-phase hexagonal ferrite material does not rise above 4 until 1 GHz. In fact, the loss factor of the hexagonal ferrite material remains relatively constant at around 3 up through approximately 800 MHz.

While maintaining the low loss factor, the material shown in FIG. 9 also maintains a permeability of around 5. This is over double the permeability that is found in typical Y-phase hexagonal ferrite materials.

Accordingly, because of the low loss factor and the high magnetic permeability, embodiments of the Y-phase hexagonal ferrite material shown with respect to FIG. 9 can be advantageous for use as a magnetodielectric material, such as in a radiofrequency antenna.

FIG. 10 illustrates the permeability and loss factor for a hexagonal ferrite material using Sc where x=0.5. Accordingly, the general equation is $Sr_{1.5}Na_{0.5}Co_{1.5}Sc_{0.5}Fe_{12}O_{22}$.

As shown in FIG. 10, the loss factor of an embodiment of the Y-phase hexagonal ferrite material does not rise above 4 until well above 1 GHz. In fact, the loss factor of the hexagonal ferrite material remains relatively constant just below 3 up through approximately 800 MHz. Even at a frequency of 1 GHz, the material only has a loss factor of around 3. Accordingly, embodiments of this disclosed Y-phase hexagonal ferrite material are particularly suited for high resonant frequency antenna applications.

Additionally, while maintaining the low loss factor, the material shown in FIG. 10 also maintains a permeability of about 5 to about 6. This is over double to about triple the permeability that is found in typical Y-phase hexagonal ferrite materials.

Accordingly, because of the low loss factor and the high magnetic permeability, embodiments of the Y-phase hexagonal ferrite material shown with respect to FIG. 10 can be advantageous for use as a magnetodielectric material, such as in a radiofrequency antenna.

Processing

Figure 11:
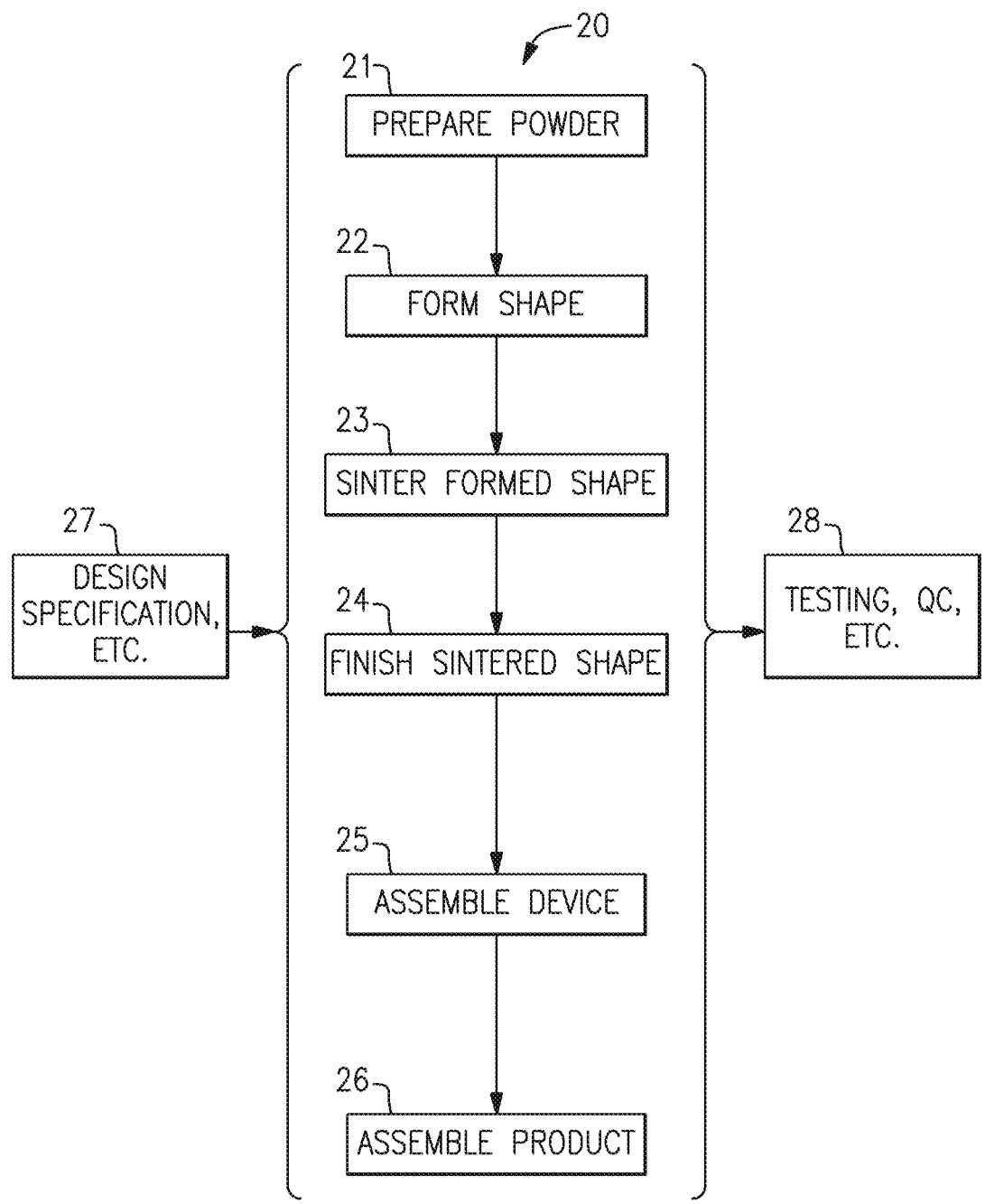
FIG. 11 shows an embodiment of a process that can be implemented to fabricate a ceramic material incorporating embodiments of Y-phase hexagonal ferrite.

FIGS. 11-15 illustrate processes for fabricating ferrite devices, such as radio frequency antennas, using one or more of the embodiments of the above disclosed hexagonal ferrite materials and having one or more features as described herein. FIG. 11 shows a process 20 that can be implemented to fabricate a ceramic material having one or more of the foregoing properties after design specifications in block 27. In block 21, powder can be prepared. In block 22, a shaped object can be formed from the prepared powder. In block 23, the formed object can be sintered. In block 24, the sintered object can be finished to yield a finished ceramic object having one or more desirable properties and testing in box 28.

In implementations where the finished ceramic object is part of a device, the device can be assembled in block 25. In implementations where the device or the finished ceramic object is part of a product, the product can be assembled in block 26.

FIG. 11 further shows that, at block 27 some or all of the steps of the example process 20 can be based on a design, specification, etc. Similarly, some or all of the steps can include or be subjected to testing, quality control, etc., at block 28.

Powder prepared can include one or more properties as described herein, and/or facilitate formation of ceramic objects having one or more properties as described herein.

Figure 12:
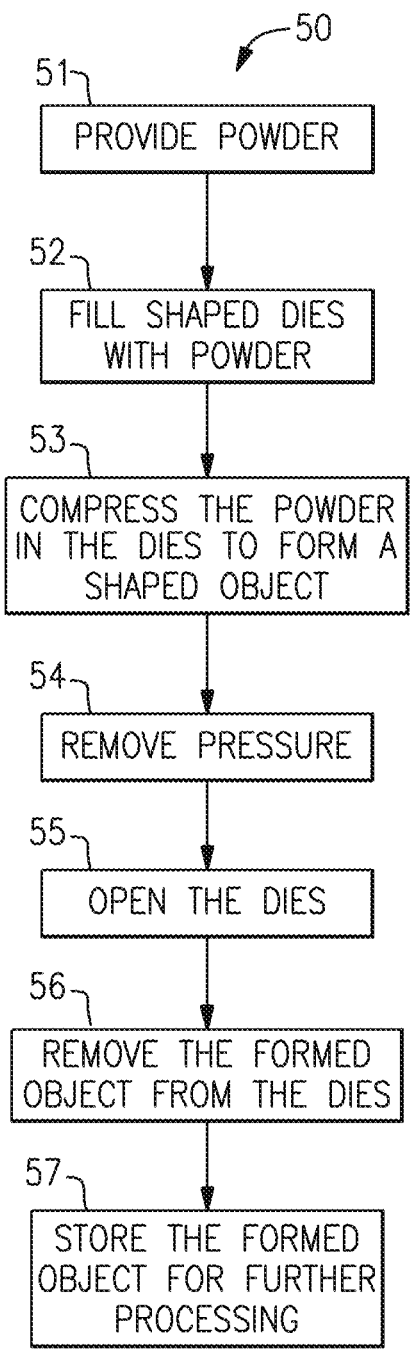
FIG. 12 shows an embodiment of a process that can be implemented to form a shaped object from powder material incorporating embodiments of Y-phase hexagonal ferrite.
Figure 13:
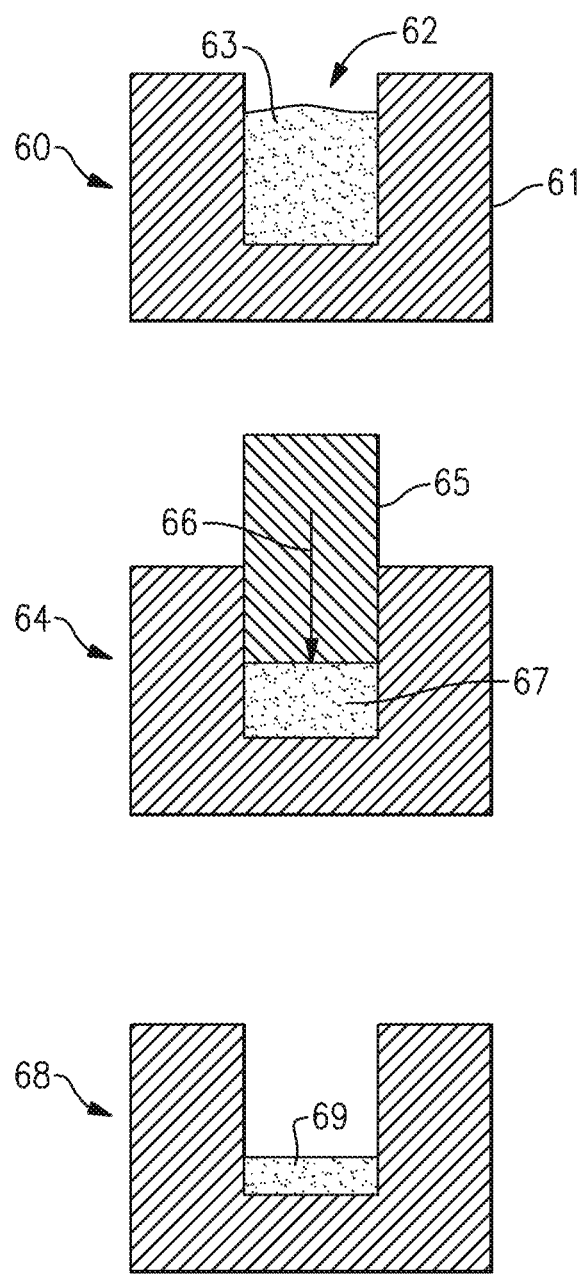
FIG. 13 shows examples of various stages of the process of FIG. 12.

In some implementations, powder prepared as described herein can be formed into different shapes by different forming techniques. By way of examples, FIG. 12 shows a process 50 that can be implemented to press-form a shaped object from a powder material prepared as provided described herein. In box 51, powder is provided. In block 52, powder is provided. In block 52, a shaped die can be filled with a desired amount of the powder. In FIG. 13, configuration 60 shows the shaped die as 61 that defines a volume 62 dimensioned to receive the powder 63 and allow such power to be pressed. In block 53, the powder in the die can be compressed to form a shaped object. Configuration 64 shows the powder in an intermediate compacted form 67 as a piston 65 is pressed (arrow 66) into the volume 62 defined by the die 61. In block 54, pressure can be removed from the die. In block 55, the piston (65) can be removed from the die (61) so as to open the volume (62). Configuration 68 shows the opened volume (62) of the die (61) thereby allowing the formed object 69 to be removed from the die. In block 56, the formed object (69) can be removed from the die (61). In block 57, the formed object can be stored for further processing. Additional forming methods familiar to those skilled in the art include but are not limited to isostatic pressing, tape casting, tape calendaring and extrusion.

Figures 14, 15:
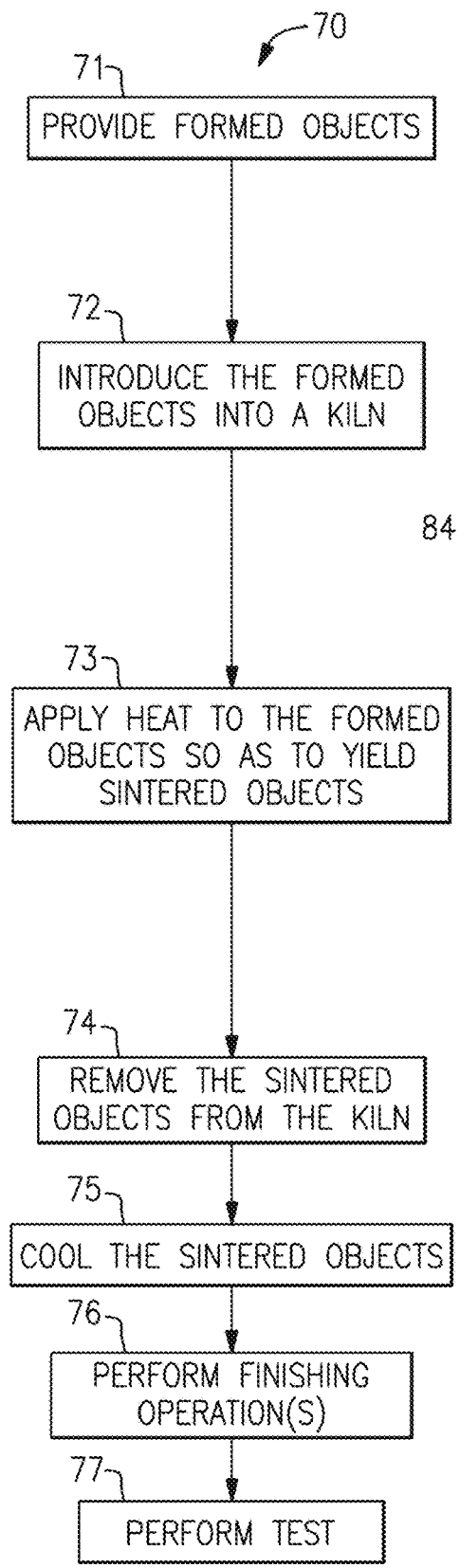
FIG. 14 shows an embodiment of a process that can be implemented to sinter formed objects such as those formed in the example of FIGS. 12 and 13.
FIG. 15 shows examples of various stages of the process of FIG. 14.

In some implementations, formed objects fabricated as described herein can be sintered to yield desirable physical properties as ceramic devices. FIG. 14 shows a process 70 that can be implemented to sinter such formed objects. In block 71, formed objects can be provided. In block 72, the formed objects can be introduced into a kiln. In FIG. 15, a plurality of formed objects 69 are shown to be loaded into a sintering tray 80. The example tray 80 is shown to define a recess 83 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 83, even when the trays are stacked together. FIG. 15 further shows a stack 84 of a plurality of loaded trays 80. A top cover 85 can be provided so that the objects loaded in the top tray generally experience similar sintering condition as those in lower trays.

In block 73, heat can be applied to the formed objects so as to yield sintered objects, such as antennas. Such application of heat can be achieved by use of a kiln. In block 74, the sintered objects can be removed from the kiln. In FIG. 15, the stack 84 having a plurality of loaded trays is depicted as being introduced into a kiln 87 (stage 86a). Such a stack can be moved through the kiln (stages 86b, 86c) based on a desired time and temperature profile. In stage 86d, the stack 84 is depicted as being removed from the kiln so as to be cooled.

In block 75, the sintered objects can be cooled. Such cooling can be based on a desired time and temperature profile. In block 76, the cooled objects can undergo one or more finishing operations. In block 77, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

Substitution of Scandium, Silicon, and/or Manganese

For magnetodielectric antenna applications, it can be advantageous to have as high of a magnetic permeability as possible. Having high magnetic permeability can lead to many benefits for magnetodielectric applications, such as improved miniaturization factors, thus leading to smaller overall footprints of components, and impedance matching to free space. Further, it can be advantageous to have high resonant frequencies which can maximize the operating frequencies of the electronic devices that the material is incorporated into, thus allowing for use of the electronic devices in higher frequency arenas.

However, high permeability magnetic oxides which have typically been used for antenna applications in the prior art tend to have low resonance frequencies. The few materials that do have high resonance frequencies usually have low magnetic permeability, making them unsuitable for use in high frequency magnetodielectric applications. For example, $Sr_2Co_2Fe_{12}O_{22}$ (Sr—Co—Y phase) has a resonant frequency well above 1 GHz, but a permeability of only 2. Thus, prior art materials have not been usable to efficiently handle high frequency applications.

Previous solutions have been focused on increasing the resonant frequency of Z-phase hexagonal ferrite material (e.g. $Co_2Z$—$Ba_3Co_2Fe_{24}O_{41}$). Specifically, substitutions of alkali metals for the barium ion in $Co_2Z$ have been performed, as disclosed in U.S. Pat. Nos. 8,524,190 and 8,609,062, hereby incorporated by reference in their entirety. While the incorporation of alkali metals for the barium has increased the resonant frequency of the material, the useable frequency of the material may still be lower than desired. So while modest improvements in resonant frequency have been detailed in the above disclosure, they may not have significantly extended the useable frequency range for $Co_2Z$ materials.

Accordingly, disclosed herein are embodiments of a Y-phase strontium hexagonal ferrite material ($Co_2Y$), as discussed above, that can have both high magnetic permeability as well as high resonance frequencies, thus making the material advantageous for use in high frequency antenna applications.

In some embodiments, permeability can be doubled or tripled from the typical values using coupled substation of an Sr—Co—Y phase hexagonal ferrite material. Further, the resonant frequency of the Y-phase hexagonal ferrite materials, relative to the Z-phase materials, can increase into the range of about 500 MHz to about 1 GHz, allowing for the material to be used for high frequency applications.

In some embodiments, as mentioned above, an example Y-phase hexagonal ferrite that can be used for high dielectric antenna components can have the equation:

$$Sr_{2-x}K_xCo_{2-x}M_xFe_{12}O_{22} \text{ or } Sr_{2-x}Na_xCo_{2-x}M_xFe_{12}O_{22}$$

when M is scandium or indium ($Sc^{3+}$ or $In^{3+}$), and with x being $0<x<2$. When scandium or indium is substituted for cobalt, this can lead to increased magnetic permeability. Most likely, this occurs because the cobalt, scandium, and indium all have a relatively similar ionic size according to the Shannon-Prewitt effective ionic radius. For example, cobalt has an ionic size of 0.885 angstroms while scandium and indium have ionic sizes of 0.885 and 0.94, respectively. In fact, the scandium and cobalt have almost identical sizes. Accordingly, when these elements are substituted into the crystal structure of the $Co_2Y$ material, minimal deformation to the crystal structure is likely to occur due to the replacement atoms fitting in generally the same place as the original atom.

Following the above equation, in some embodiments silica and/or aluminum can further be incorporated into a Sr—Co—Y or the Sc and Na co-substituted hexagonal ferrite material, thereby generally increasing the resonant frequency and permeability of the hexagonal ferrite material, providing for advantageous properties for radiofrequency components. For example, in some embodiments, $Al^{3+}$ can be substituted in for $Fe^{3+}$, thereby adjusting the $Sr_2Co_2Fe_{12}O_{22}$ lattice to include the substituted atoms.

Thus, in some embodiments, the composition can be $Sr_2Co_2Fe_{12-y}Al_yO_{22}$ or $Sr_{2-x}(K,Na)_xCo_{2-x}M_xFe_{12-y}Al_yO_{22}$, with x being $0<x<2$, y being $0<y<12$, and where M is scandium or indium ($Sc^{3+}$ or $In^{3+}$).

Further, silicon can be added into the $Sr_2Co_2Fe_{12}O_{22}$, $Sr_{2-x}(K,Na)_xCo_{2-x}M_xFe_{12}O_{22}$ or $Sr_{2-x}(K,Na)_xCo_{2-x}M_xFe_{12-y}Al_yO_{22}$ with x being $0<x<2$, y being $0<y<12$, and where M is scandium or indium ($Sc^{3+}$ or $In^{3+}$) to adjust the magnetic properties of the hexagonal ferrite material. Si additions can act as a grain growth inhibitor and therefore be segregated at the grain boundaries, which can reduce magnetostriction effects in sintered materials.

Moreover, $Mn^{3+}$ can be added into the hexagonal ferrite material to prevent $Fe^{3+}$ reduction as discussed above, and thus improve the dielectric loss.

In some embodiments, silicon can be located in the grain boundaries of the crystal structure, while manganese and aluminum can be incorporated into the crystal structure, those this configuration is not limiting.

In some embodiments, the composition can be $Sr_2Co_2Fe_{12-y}Mn_yO_{22}$, $Sr_{2-x}K_xCo_{2-x}M_xFe_{12-y}Mn_yO_{22}$ or $Sr_{2-x}K_xCo_{2-x}M_xFe_{12-y-z}Mn_yAl_zO_{22}$ with x being $0<x<2$, y being $0<y<12$, z being $0<z<12$, (y+z) being $0<(y+z)<12$, where M is scandium or indium ($Sc^{3+}$ or $In^{3+}$).

Figure 16:
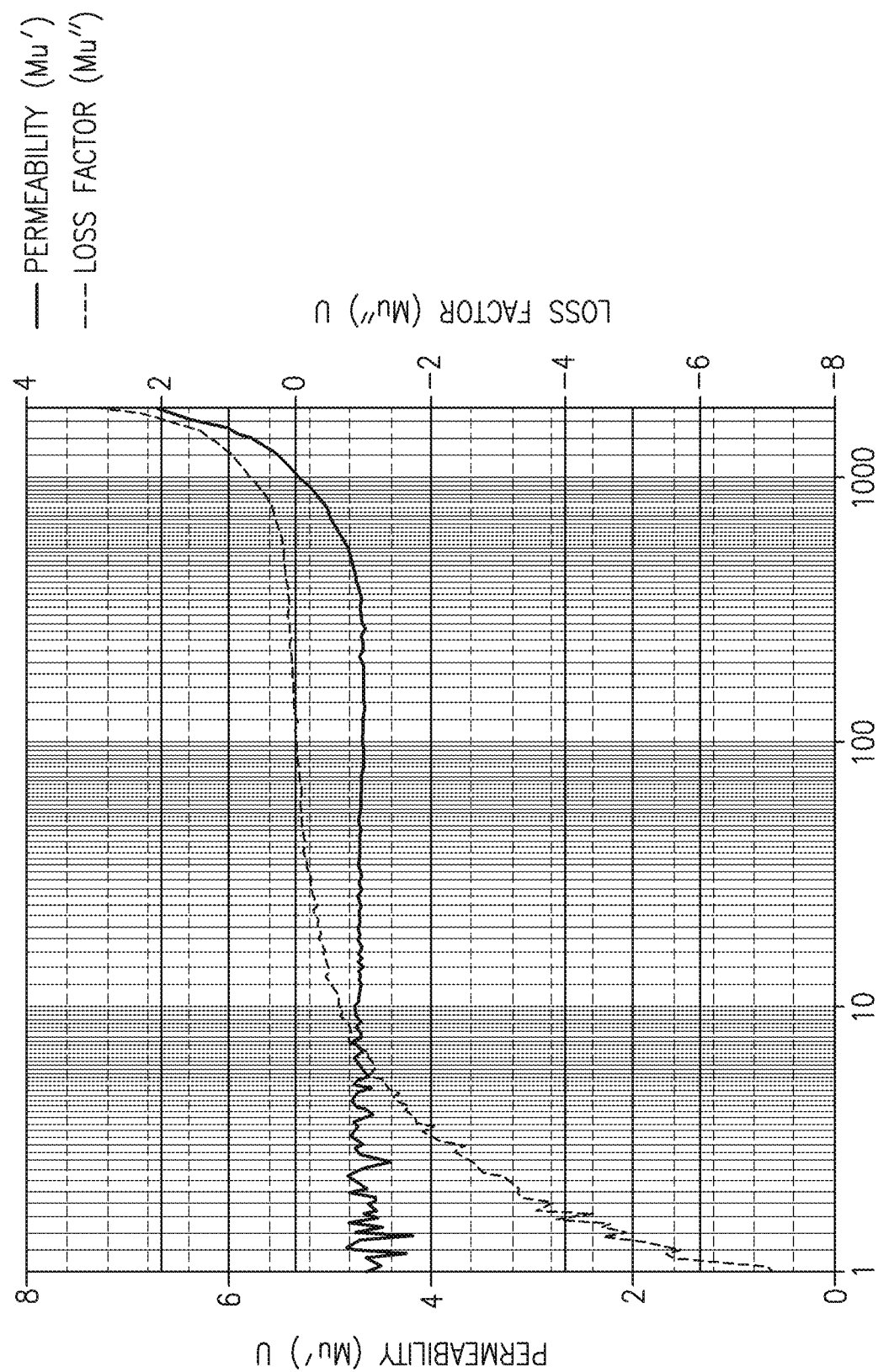
FIG. 16 illustrates permeability and loss factor for an embodiment of a Y-phase hexagonal ferrite.
Figure 17:
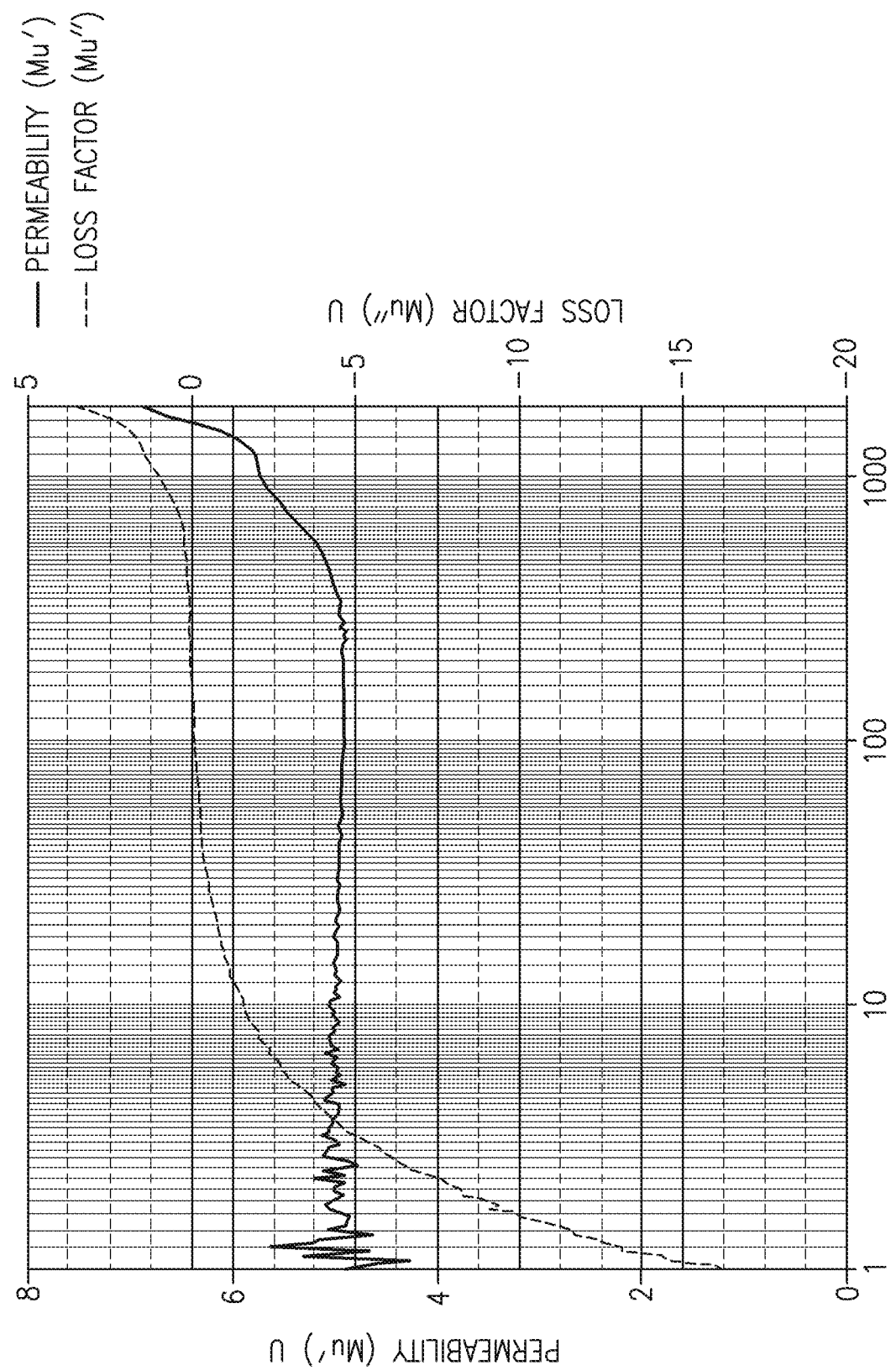
FIG. 17 illustrates permeability and loss factor for an embodiment of a Y-phase hexagonal ferrite.

FIGS. 16-17 show impedance spectra using the above disclosed substitution technique. Typically, the impedance spectra is performed using dielectric spectroscopy, also known as impedance spectroscopy or electrochemical impedance spectroscopy. The impedance spectra can show the different dielectric properties of a medium as a function of different frequencies. Specifically, FIGS. 16-17 illustrates two different compositions of a Y-phase hexagonal ferrite including Sc, Al, Si, and Mn.

In FIGS. 16-17, the impedance spectra shows both permeability ($\mu'$) as well as loss factor ($\mu''$) across a range of frequencies. It can be advantageous for magnetodielectric materials used in radio frequency applications to have a minimal change in properties across the range of frequencies, and in particular a minimal $\mu''$ and therefore a minimal loss tangent at those particular frequencies. When the loss tangent begins to increase or spike, the material would become unsuitable for antenna applications.

Along with minimizing the loss tangent spike, it can be advantageous to adjust the spike in loss tangent to as high a frequency as possible. As mentioned, when the loss tangent spikes, the material becomes less useful at that frequency. So having a loss tangent spike at higher frequencies means that the material can be used at higher frequencies with minimized loss.

FIG. 16 shows an embodiment of the above composition where x=0.3 and including Sc, thus forming $Sr_{1.7}Na_{0.3}Co_{1.7}Sc_{0.3}Fe_{11.5}Al_{0.5}O_{22}$. As shown, the loss tangent of the composition can be relatively minimized until higher resonant frequency spectrums. For example, the permeability and loss factor of the material is approximately 5 up through over 500 MHz. While at this point the $\mu''$ (loss factor) and the loss tangent begins to steadily increase, the low $\mu''$ and loss tangent is retained even up to 1 GHz. This is a high permeability and low loss factor for such high frequencies, and shows that embodiments of the disclosed material is advantageous for high frequency applications.

FIG. 17 shows an embodiment of the above composition where x=0.4 and including Sc, thus forming $Sr_{1.6}Na_{0.4}Co_{1.6}Sc_{0.4}Fe_{11.5}Al_{0.5}O_{22}$. As shown, the loss tangent of the composition can be relatively minimized until higher resonant frequency spectrums. For example, the permeability of the material is approximately 5 up through over 500 MHz whereas the loss factor is approximately 6. While at this point the $\mu''$ (loss factor) and the loss tangent begins to steadily increase, the low $\mu''$ and loss tangent is retained even up to 1 GHz. This is a high permeability and low loss factor for such high frequencies, and shows that embodiments of the disclosed material is advantageous for high frequency applications.

Incorporation of Stoichiometric Oxides

While the disclosure above shows certain methods and substitutions for improving the magnetic properties of a Y-phase hexagonal ferrite materials, improvements can also be made into the hexagonal ferrite material by incorporating second-phase oxides into the hexagonal ferrite material. These second-phase oxides can either dissolve into the main hexagonal phase structure, making it non-stoichiometric, or may be incorporated into the ceramic as second phases. This incorporation can be done with, or without, the other methods for improving magnetic properties disclosed otherwise herein.

Thus, in some embodiments, oxides consistent with the stoichiometry of Z-Phase $Sr_3Co_2Fe_{24}O_{41}$ could be incorporated into embodiments of a Y-phase hexagonal ferrite material to improve certain magnetic properties of the material. Additionally, $CoFe_2O_4$ (with the spinel structure) or $SrFe_{12}O_{19}$ (with the magnetoplumbite structure) can be added to the Y-phase hexagonal ferrite material and may either dissolve in the Y-phase making it non-stoichiometric or exist as distinct second phases within the ceramic body. However, other oxides can be used as well and the specific oxide incorporated into the material is not limiting.

In some embodiments, the oxides can be incorporated into a specific Y-phase hexagonal ferrite composition. For example, these compounds can be incorporated into a structure of $Sr_{1.6}Na_{0.4}Co_{1.6}Sc_{0.4}Fe_{11}O_{22}$ to form a hexagonal ferrite material having improved properties. However, other compositions of Y-phase hexagonal ferrite can be used, and the type of Y-phase hexagonal ferrite in which the oxide is incorporated into is not limiting. The included oxide additions can be advantageous as they can improve at least some of the magnetodielectric properties discussed above. Further, by the improving magnetic properties, a number of compositions which can be used to synthesize magnetodielectric antenna materials can be used.

In some embodiments, a combination of $Sr_{1.6}Na_{0.4}Co_{1.6}Sc_{0.4}Fe_{11}O_{22}$ with 2 (or about 2) wt. % $Sr_3Co_2Fe_{24}O_{41}$ can lead to excellent properties for use as a magnetodielectric antenna material. For example, FIG. 18 shows Mu' (permeability) and magnetic Q data compared to a frequency applied to the hexagonal ferrite material.

Figure 18:
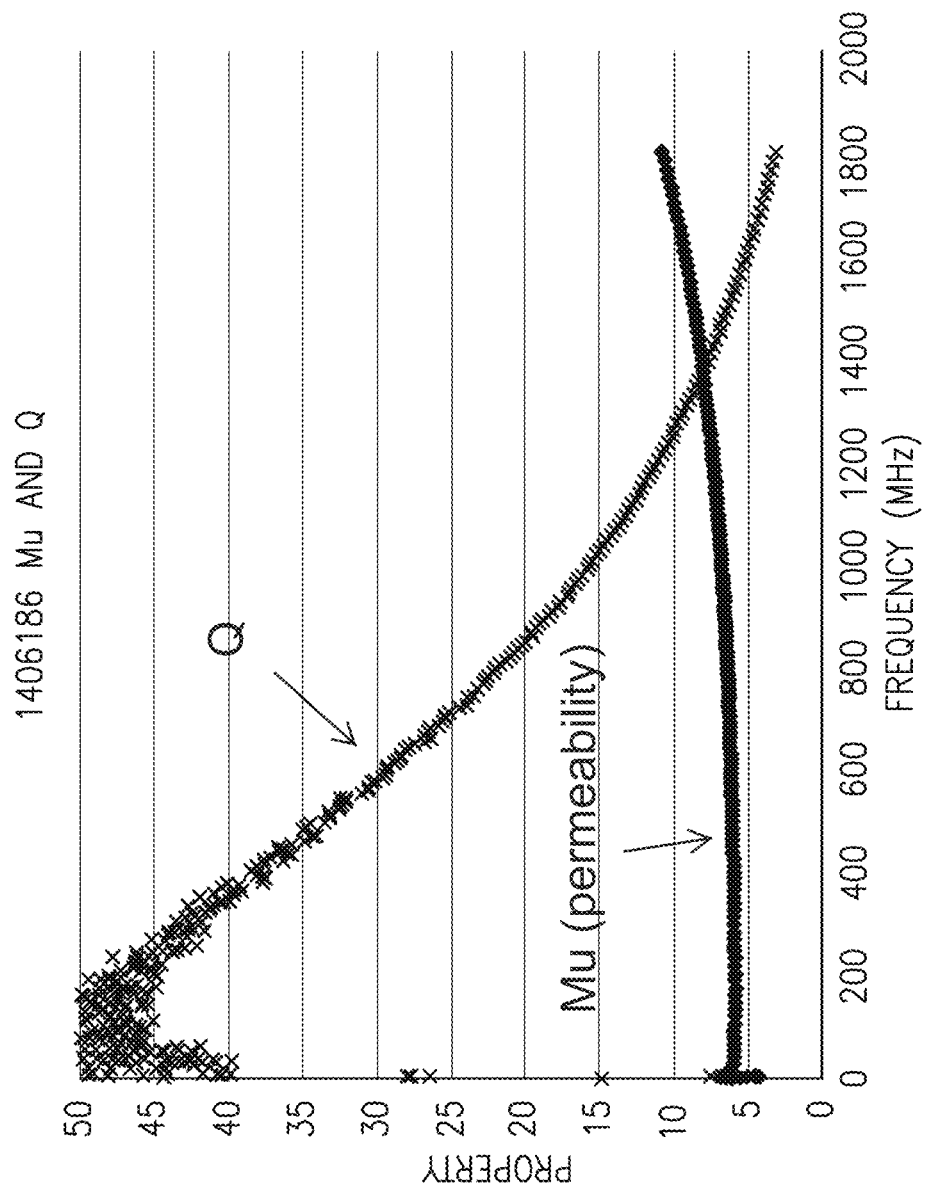
FIG. 18 illustrates permeability and magnetic Q for an embodiment of a Y-phase hexagonal ferrite with an incorporated oxide.

As shown in FIG. 18, the Q factor of an embodiment of the disclosed Y-phase hexagonal ferrite material is extremely high at low frequency values. However, it is advantageous for the material to maintain high Q factor values even at higher frequencies, such as those between 500 MHz and 1 GHz or above. Advantageously, embodiments of the disclosed material are able to maintain relatively high Q factors even at these high frequencies. While Q values do decrease as the applied frequency increases, the drop is not drastic, which would occur in other materials previously used. Accordingly, embodiments of the disclosed hexagonal ferrite material still maintain/achieve high Q values at high frequencies.

For example, embodiments of the hexagonal ferrite material have a Q value of greater than about 20 at 800 MHz. Further, embodiments of the hexagonal ferrite material have a Q value of greater than about 15 at 1 GHz. Therefore, embodiments of the disclosed Y-phase hexagonal ferrite material can be used in higher frequency applications than are possible with current bulk materials.

Moreover, as shown in FIG. 18, the hexagonal ferrite material can maintain a high permeability throughout its frequency ranges even while having the high Q factor discussed above. As shown, the hexagonal ferrite material maintains a relatively even permeability, µ', of about 6, 7, or 8 through 800 MHz to 1 GHz. This permeability level is significantly higher than the typical permeability value of 2 for a basic Y-phase hexagonal ferrite structure. In fact, embodiments of the disclosed Y-phase hexagonal ferrite values can achieve permeability levels of 2 to 3 times that of standard Y-phase hexagonal ferrite materials at high frequencies. Accordingly, embodiments of the disclosed hexagonal ferrite material can achieve high Q values while also maintaining high permeability, thus making them advantageous for use in magnetodielectric antennas at frequencies between 500 MHz and 1 GHz.

Further, embodiments of the hexagonal ferrite material can have a dielectric constant (e.g., permittivity) of approximately 10-11. The relatively high permeability gives these materials a better impedance match to free space than $Sr_2Co_2Fe_{12}O_{22}$. Recall that when $\mu_r=\varepsilon_r$, there is a perfect impedance match to free space.

Two figures of merit for antenna performance include the miniaturization factor and the bandwidth. First, the miniaturization factor is determined by the formula:

$$d_{\mathit{eff}}=d_o(\varepsilon_r\mu_r)^{-1/2}$$

where $d_{\mathit{eff}}/d_o$ are the miniaturization factor, $\varepsilon_r$ is the dielectric constant of the antenna material, and $\mu_r$ is the magnetic permeability of the antenna material. Both $\varepsilon_r$ and $\mu_r$ are dependent on frequency in magnetic oxide antennas. Second the effective bandwidth (or efficiency) is determined by the formula:

$$\eta=\eta_o(\mu_r/\varepsilon_r)^{1/2}$$

where $\eta/\eta_o$ describes the efficiency (or bandwidth) of the material. This efficiency is maximized if $\mu_r$ is maximized.

It can be advantageous for miniaturization to have both high dielectric constant and high permeability. Having high values can lead to improved miniaturization factors. Further, for the efficiency equation, it can be advantageous to have permeability greater to or equal to that of the dielectric constant. However, it can be advantageous to have both permeability and dielectric constant to be as high as possible. Accordingly, because embodiments of the described Y-phase hexagonal ferrite material have high permeability and high dielectric constant, and having a dielectric constant relatively close to permeability, they can be useful for antenna applications where a good impedance match to free space is desirable.

Table I illustrates magnetic permeability spectra of embodiments of substituted Sr—Co—Y phase hexagonal ferrites, such as using the methods described in detail above.

TABLE I

| | \multicolumn{8}{c}{Magnetic Permeability Spectra} | | | | | | | |
|---|---|---|---|---|---|---|---|---|
| Sample (all added percents by weight) | 500 MHz µ' | 500 MHz µ''' | 500 MHz Q | 750 MHz µ' | 750 MHz µ''' | 750 MHz Q | 1 GHz µ' | 1 GHz µ''' | 1 GHz Q |
| $Sr_2Co_2Fe_{12}O_{22}$ | 2.34 | .108 | 21.7 | 2.35 | .145 | 16.2 | 2.37 | .190 | 12.5 |
| $Sr_2Co_2Fe_{12}O_{22}$ + 0.1% $K_2CO_3$ | 2.47 | .050 | 49.4 | 2.53 | .072 | 35.1 | 2.60 | .091 | 28.6 |
| $Sr_{1.75}K_{0.25}CO_{1.75}Sc_{0.25}Fe_{12}O_{22}$ | 3.82 | .167 | 22.9 | 3.93 | .242 | 16.2 | 4.10 | .359 | 11.4 |
| $Sr_{1.5}K_{0.5}Co_{1.5}Sc_{0.5}Fe_{12}O_{22}$ | 3.28 | .148 | 22.2 | 3.42 | .233 | 14.7 | 3.63 | .411 | 8.83 |
| $Sr_{1.75}K_{0.25}Co_{1.75}In_{0.25}Fe_{12}O_{22}$ | 3.08 | .138 | 22.3 | 3.19 | .188 | 17.0 | 3.37 | .298 | 11.3 |
| $Sr_{1.5}K_{0.5}Co_{1.5}In_{0.5}Fe_{12}O_{22}$ | 4.64 | .204 | 22.7 | 5.21 | .540 | 9.65 | 5.92 | 1.61 | 3.68 |

TABLE I-continued

| | Magnetic Permeability Spectra | | | | | | | | |
|---|---|---|---|---|---|---|---|---|---|
| Sample (all added percents by weight) | 500 MHz $\mu'$ | 500 MHz $\mu''$ | 500 MHz Q | 750 MHz $\mu'$ | 750 MHz $\mu''$ | 750 MHz Q | 1 GHz $\mu'$ | 1 GHz $\mu''$ | 1 GHz Q |
| $Sr_{1.75}Na_{0.25}Co_{1.75}Sc_{0.25}Fe_{12}O_{22}$ | 5.12 | .181 | 28.3 | 5.31 | .285 | 18.6 | 5.66 | .421 | 13.4 |
| $Sr_{1.6}Na_{0.4}Co_{1.6}Sc_{0.4}Fe_{12}O_{22}$ | 6.12 | .227 | 27.0 | 6.42 | .356 | 18.0 | 6.92 | .531 | 13.0 |
| $Sr_{1.5}Na_{0.5}Co_{1.5}Sc_{0.5}Fe_{12}O_{22}$ | 5.23 | .179 | 29.2 | 5.44 | .266 | 20.5 | 5.91 | .401 | 14.7 |
| $Sr_{1.75}Na_{0.25}Co_{1.75}In_{0.25}Fe_{12}O_{22}$ | 1.67 | .034 | 49.1 | 1.68 | .046 | 36.5 | 1.70 | .056 | 30.4 |
| $Sr_{1.5}Na_{0.5}Co_{1.5}In_{0.5}Fe_{12}O_{22}$ | 1.83 | .025 | 73.2 | 1.83 | .056 | 32.7 | 1.85 | .064 | 28.9 |
| $Sr_{1.7}Na_{0.3}Co_{1.7}Sc_{0.3}Fe_{12}O_{22}$ + 0.5% $Al_2O_3$, 0.2% $MnO_2$ and 0.2% $SiO_2$ | 4.81 | .198 | 24.3 | 5.05 | .401 | 12.6 | 5.35 | .711 | 7.52 |
| $Sr_{1.6}Na_{0.4}Co_{1.6}Sc_{0.4}Fe_{12}O_{22}$ + 0.5% $Al_2O_3$, 0.2% $MnO_2$ and 0.2% $SiO_2$ | 5.11 | .183 | 27.9 | 5.48 | .482 | 11.4 | 5.74 | 1.04 | 5.52 |
| $Sr_{1.6}Na_{0.4}Co_{1.6}Sc_{0.4}Fe_{12}O_{22}$ + 2.0% $Sr_3CO_2Fe_{24}O_{41}$ | 6.17 | .185 | 33.4 | 6.47 | .275 | 23.5 | 6.95 | .442 | 15.72 |

Processing

Certain aspects of the present disclosure provide processing techniques for increasing the permeability of Y phase hexaferrites at higher frequencies. In one implementation, the processing techniques involve methods of magnetic texturing of Y phase hexaferrites to result in a textured ceramic with improved magnetic properties. In one embodiment, the method of magnetic texturing used in forming involves using a reaction sintering method, which includes the steps of aligning M-phase ($BaFe_{12}O_{19}$ uniaxial magnetization) with non-magnetic additives in a static magnetic field and reacting with BaO source and CoO to form the Y-phase ($Sr_2Me_2Fe_{12}O_{22}$). In another embodiment, the method of magnetic texturing used in forming Sr—$Co_2Y$ involves using a rotating magnetic field method, which includes the steps of aligning Sr—$Co_2Y$ phase (planar magnetization) with magnetic texturing occurring in a rotating magnetic field. The inventor has found that the degree of alignment, thus permeability gain, is far superior in a rotating magnetic field.

In some embodiments, the processing technique for forming the Y phase material includes making Y phase Fe deficient to inhibit reduction of Fe as the inventor believes that dielectric and magnetic loss is increased by reduction of Fe ($Fe^{3+} \rightarrow Fe^{2+}$) at high temperatures. The processing technique includes the step of heat treatment or annealing in oxygen to inhibit reduction of Fe and cause $Fe^{2+} \rightarrow Fe^3$.

In some other embodiments, the processing technique for forming Sr—$Co_2Y$ includes forming fine grain hexagonal ferrite particles. The process involves using high energy milling to reduce the particle size.

Figure 19:
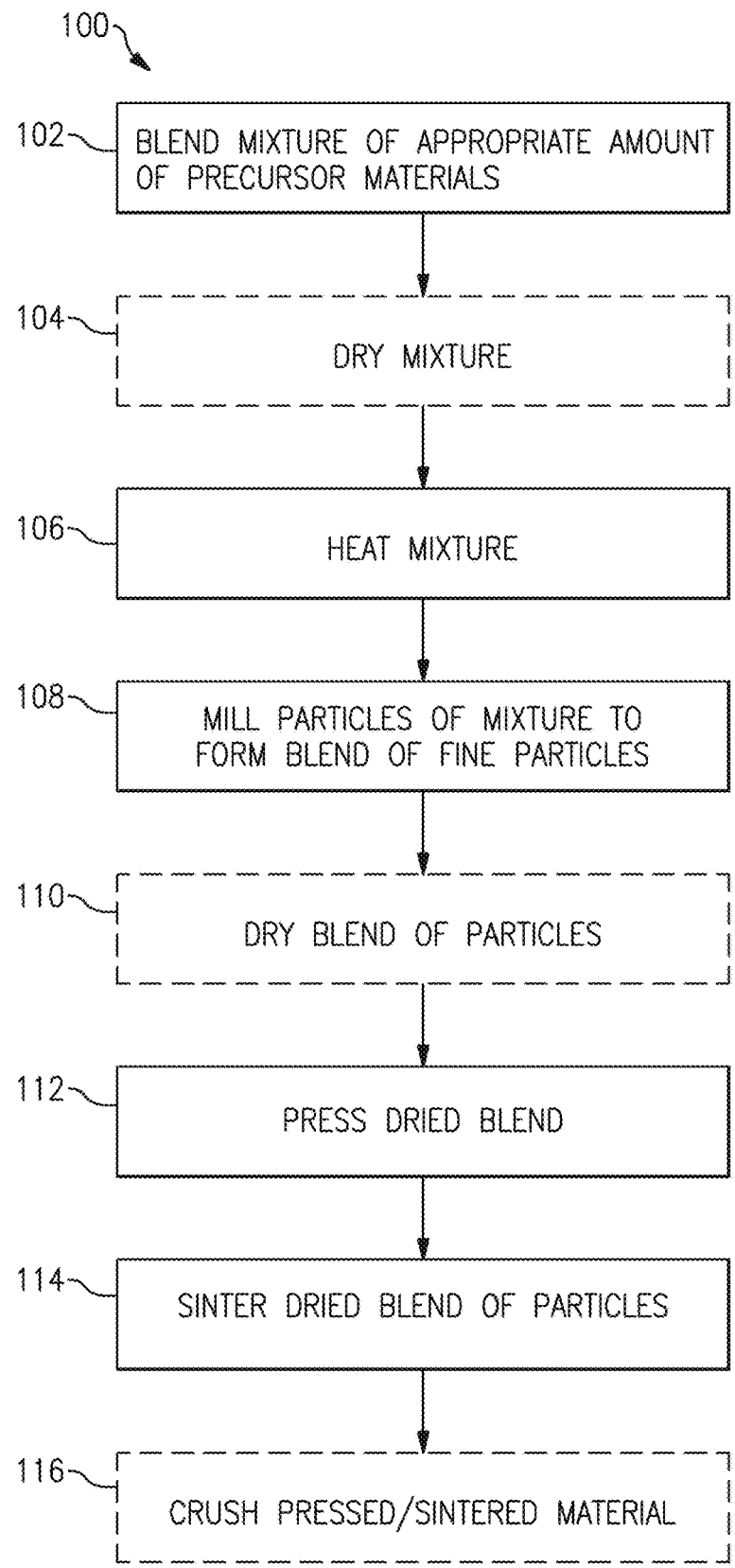
FIG. 19 is a flow chart illustrating an embodiment of a method of forming a hexagonal ferrite material.

FIG. 19 illustrates a method 100 of forming a Sr—$Co_2Y$ material according to a preferred embodiment. As shown in FIG. 19, appropriate amounts of precursor materials—reactants that may provide strontium, cobalt, iron, one or more alkali metals, scandium, indium, aluminum, silica, manganese and oxygen that can form the magnetic material—are mixed together in Step 102. In some aspects, at least a portion of the oxygen may be provided in the form of an oxygen-containing compound of strontium (Sr), cobalt (Co), iron (Fe), or one or more alkali metals. For example, these elements may be provided in carbonate or oxide forms, or in other oxygen-containing precursor forms known in the art. In one or more aspects, one or more precursor materials may be provided in a non-oxygen-containing compound, or in a pure elemental form. In other aspects, oxygen could be supplied from a separate compound, such as, for example, $H_2O_2$ or from gaseous oxygen or air. For example, in one embodiment, $SrCO_3$, $Co_3O_4$, $NaHCO_3$, $Sc_2O_3$ and $Fe_2O_3$ precursors are mixed in a ratio appropriate for the formation of the Y phase material. These precursor compounds may be mixed or blended in water or alcohol using, for example, a Cowles mixer, a ball mill, or a vibratory mill. These precursors may also be blended in a dry form.

The blended mixture may then be dried if necessary in Step 104. The mixture may be dried in any of a number of ways, including, for example, pan drying or spray drying. The dried mixture may then be heated in Step 106 at a temperature and for a period of time to promote calcination. For example, the temperature in the heating system used in heating Step 106 may increase at a rate of between about 20° C. per hour and about 200° C. per hour to achieve a soak temperature of about 1000° C.-1300° C., or about 1100° C. to 1250° C., which may be maintained for about two hours to about twelve hours. The heating system may be, for example, an oven or a kiln. The mixture may experience a loss of moisture, and/or reduction or oxidation of one or more components, and/or the decomposition of carbonates and/or organic compounds which may be present. At least a portion of the mixture may form a hexaferrite solid solution.

The temperature ramp rate, the soak temperature, and the time for which the mixture is heated may be chosen depending on the requirements for a particular application. For example, if small crystal grains are desired in the material after heating, a faster temperature ramp, and/or lower soak temperature, and/or shorter heating time may be selected as opposed to an application where larger crystal grains are desired. In addition, the use of different amounts and/or forms of precursor materials may result in different requirements for parameters such as temperature ramp rate and soaking temperature and/or time to provide desired characteristics to the post-heated mixture.

After heating, the mixture, which may have formed agglomerated particles of hexaferrite solid solution, may be cooled to room temperature, or to any other temperature that would facilitate further processing. The cooling rate of the heating system may be, for example, 80° C. per hour. In step 108, the agglomerated particles may be milled. Milling may take place in water, in alcohol, in a ball mill, a vibratory mill, or other milling apparatus. In some embodiments, the milling is continued until the median particle diameter of the resulting powdered material is from about one to about four microns, although other particle sizes, for example, from about one to about ten microns in diameter, may be acceptable in some applications. In a preferred embodiment, high energy milling is used to mill the particles to a fine particle size of 0.2 to 0.9 microns in diameter. This particle size may be measured using, for example, a sedigraph or a laser scattering technique. A target median particle size may be selected to provide sufficient surface area of the particles to facilitate sintering in a later step. Particles with a smaller median diameter may be more reactive and more easily sintered than larger particles. In some methods, one or more alkali metals or alkali metal precursors or other dopant materials may be added at this point rather than, or in addition to, in step 102.

The powdered material may be dried if necessary in step 110 and the dried powder may be pressed into a desired shape using, for example, a uniaxial press or an isostatic press in step 112. The pressure used to press the material may be, for example, up to 80,000 N/m, and is typically in the range of from about 20,000 N/m to about 60,000 N/m.sup.2. A higher pressing pressure may result in a more dense material subsequent to further heating than a lower pressing pressure.

In step 114, the pressed powdered material may be sintered to form a solid mass of doped hexaferrite. The solid mass of doped hexaferrite may be sintered in a mold having the shape of a component desired to be formed from the doped hexaferrite. Sintering of the doped hexaferrite may be performed at a suitable or desired temperature and for a time period sufficient to provide one or more desired characteristics, such as, but not limited to, crystal grain size, level of impurities, compressibility, tensile strength, porosity, and in some cases, magnetic permeability. Preferably, the sintering conditions promote one or more desired material characteristics without affecting, or at least with acceptable changes to other undesirable properties. For example, the sintering conditions may promote formation of the sintered doped hexaferrite with little or minimal iron reduction. In one embodiment, the temperature used in the sintering step 114 is preferably between 1100° C. to 1250° C. According to some embodiments, the temperature in the heating system used in the sintering step 114 may be increased at a rate of between about 20° C. per hour and about 200° C. per hour to achieve a soak temperature of about 1000° C.-1450° C. or about 1100° C. to 1150° C. or about 1100° C.-1250° C. which may be maintained for about two hours to about twelve hours. The heating system may be, for example, an oven or a kiln. A slower ramp, and/or higher soak temperature, and/or longer sintering time may result in a more dense sintered material than might be achieved using a faster temperature ramp, and/or lower soak temperature, and/or shorter heating time. Increasing the density of the final sintered material by making adjustments, for example, to the sintering process can be performed to provide a material with a desired magnetic permeability, saturation magnetization, and/or magnetostriction coefficient. According to some embodiments of methods according to the present disclosure, the density range of the sintered hexaferrite may be between about 4.50 g/cm$^3$ and about 5.36 g/cm$^3$. A desired magnetic permeability of the doped hexaferrite may also be achieved by tailoring the heat treatment of the material to produce grains with desired sizes. The hexaferrite may also be crush pressed and further sintered in step 116 to form a final hexaferrite product.

The grain size of material produced by embodiments of the above method may vary from between about five micrometers and one millimeter in diameter depending upon the processing conditions, with even larger grain sizes possible in some aspects of methods according to the present disclosure. In some aspects, each crystal of the material may comprise a single magnetic domain. Both doped Sr—Co$_2$Y and chemically substituted (for example, Na and Sc) Sr—Co$_2$Y may be members of the planar hexaferrite family called ferroxplana, having a Y-type ferrite crystal structure.

Figure 20:
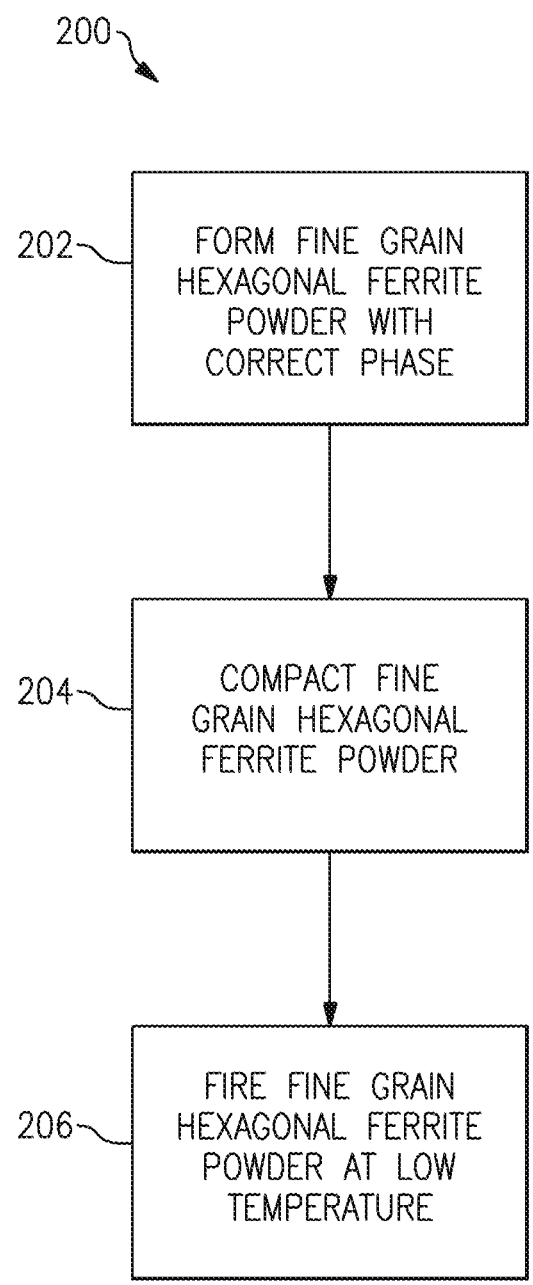
FIG. 20 is a flow chart illustrating an embodiment of a method of forming a hexagonal ferrite material.

FIG. 20 illustrates a method 200 of forming textured Sr—Co$_2$Y according to another embodiment adapted to reduce the magnetostriction and improve the resonant frequency of the material. The method 200 begins with step 202 in which a fine grain hexagonal ferrite powder is formed. In one implementation, the fine grain hexagonal ferrite powder is a strontium cobalt ferrite Y-phase powder. This powder can be synthesized using a chemical process known in the art such as co-precipitation. The Sr—Co$_2$Y can also be synthesized via sol-gel, calcining, and mechanical milling using a Netzsch zeta-mill or the like. In one embodiment, the Sr—Co$_2$Y powder has particle sizes of less than about 1 micron and surface areas of greater than about 6 m$^2$/g. In another embodiment, the Sr—Co$_2$Y powder has an average particle size of less than about 1 micron and an average surface area of greater than about 6 m$^2$/g.

As FIG. 20 further shows, the method 200 further comprises step 204 in which the hexagonal ferrite powder is compacted by a known process such as cold isostatic pressing, uniaxial pressing, extrusion, or the like. As also shown in FIG. 20, the hexagonal powder is subsequently fired at step 206 at a temperature between about 1100° C. to 1250° C., which is lower than the standard, conventional sintering temperature for the same material. The resulting material is preferably a fine grained hexagonal ferrite material.

Power Amplifier Modules and Wireless Devices

Figure 21:
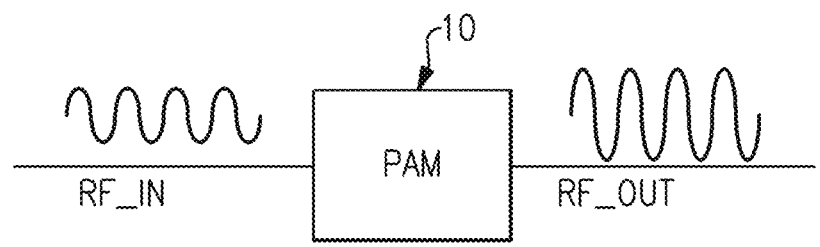
FIG. 21 is a power amplifier modular which can incorporate embodiments of the disclosed hexagonal ferrite material.
Figure 22:
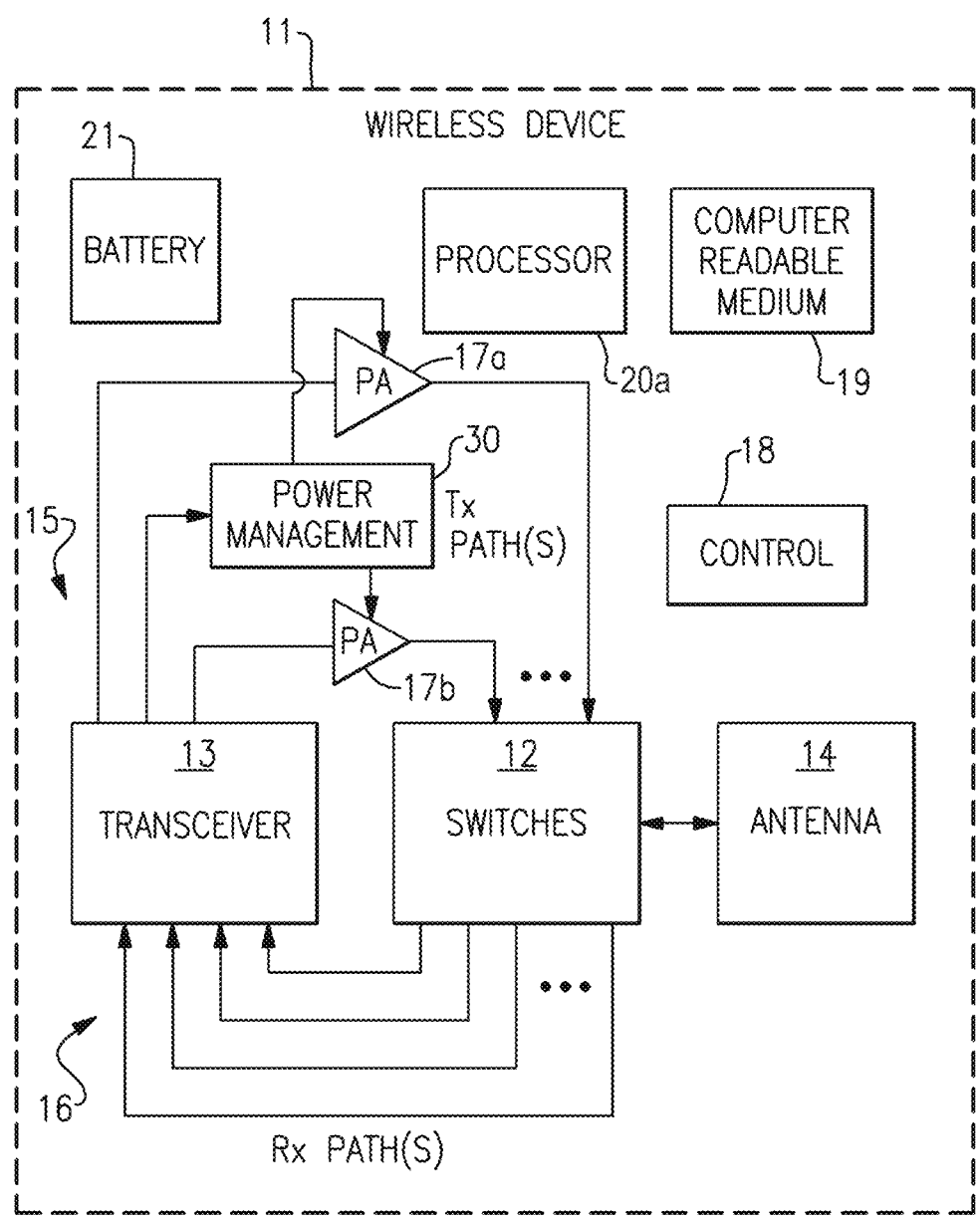
FIG. 22 is a wireless device which can incorporate embodiments of the disclosed hexagonal ferrite material.

FIGS. 21 and 22 respectively illustrate a power amplifier module 10 and wireless device 11 which can include one or more radio frequency devices implemented using any of the methods, materials, and devices of the present disclosure. For instance, the power amplifier module 10 and the wireless device 11 can include one or more antennas, transformers, inductors, circulators, absorbers, or other RF devices or other devices implemented according to the present disclosure, including devices incorporating, without limitation: increased resonant frequency alkali-doped Y-phase hexagonal ferrites, increased resonant frequency potassium-doped hexagonal ferrite, magnetodielectric Y-phase strontium hexagonal ferrite materials formed by sodium substitution, and ferrite material incorporating oxides for radiofrequency operations.

FIG. 21 is a schematic diagram of a power amplifier module (PAM) 10 for amplifying a radio frequency (RF) signal. The illustrated power amplifier module 10 amplifies an RF signal (RF_IN) to generate an amplified RF signal (RF_OUT).

FIG. 22 is a schematic block diagram of an example wireless or mobile device 11. The example wireless device 11 depicted in FIG. 22 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, 22 or more radio frequency spectrum bands.

One or more features of the present disclosure can be implemented in the foregoing example modes and/or bands, and in other communication standards. For example, 802.11, 2G, 3G, 4G, LTE, and Advanced LTE are non-limiting examples of such standards. To increase data rates, the wireless device 11 can operate using complex modulated signals, such as 64 QAM signals.

In certain embodiments, the wireless device 11 can include switches 12, a transceiver 13, an antenna 14, power amplifiers 17a, 17b, a control component 18, a computer readable medium 19, a processor 20a, a battery 21, and a power management system 30, any of which can include embodiments of the disclosed material.

The transceiver 13 can generate RF signals for transmission via the antenna 14. Furthermore, the transceiver 13 can receive incoming RF signals from the antenna 14.

It will be understood that various functionalities associated with the transmission and receiving of RF signals can be achieved by one or more components that are collectively represented in FIG. 22 as the transceiver 13. For example, a single component can be configured to provide both transmitting and receiving functionalities. In another example, transmitting and receiving functionalities can be provided by separate components.

Similarly, it will be understood that various antenna functionalities associated with the transmission and receiving of RF signals can be achieved by one or more components that are collectively represented in FIG. 22 as the antenna 14. For example, a single antenna can be configured to provide both transmitting and receiving functionalities. In another example, transmitting and receiving functionalities can be provided by separate antennas. In yet another example, different bands associated with the wireless device 11 can operate using different antennas.

In FIG. 22, one or more output signals from the transceiver 13 are depicted as being provided to the antenna 14 via one or more transmission paths 15. In the example shown, different transmission paths 15 can represent output paths associated with different bands and/or different power outputs. For instance, the two example power amplifiers 17a, 17b shown can represent amplifications associated with different power output configurations (e.g., low power output and high power output), and/or amplifications associated with different bands. Although FIG. 22 illustrates a configuration using two transmission paths 15 and two power amplifiers 17a, 17b, the wireless device 11 can be adapted to include more or fewer transmission paths 15 and/or more or fewer power amplifiers.

In FIG. 22, one or more detected signals from the antenna 14 are depicted as being provided to the transceiver 13 via one or more receiving paths 16. In the example shown, different receiving paths 16 can represent paths associated with different bands. For example, the four example receiving paths 16 shown can represent quad-band capability that some wireless devices are provided with. Although FIG. 22 illustrates a configuration using four receiving paths 16, the wireless device 11 can be adapted to include more or fewer receiving paths 16.

To facilitate switching between receive and transmit paths, the switches 12 can be configured to electrically connect the antenna 14 to a selected transmit or receive path. Thus, the switches 12 can provide a number of switching functionalities associated with operation of the wireless device 11. In certain embodiments, the switches 12 can include a number of switches configured to provide functionalities associated with, for example, switching between different bands, switching between different power modes, switching between transmission and receiving modes, or some combination thereof. The switches 12 can also be configured to provide additional functionality, including filtering and/or duplexing of signals.

FIG. 22 shows that in certain embodiments, a control component 18 can be provided for controlling various control functionalities associated with operations of the switches 12, the power amplifiers 17a, 17b, the power management system 30, and/or other operating components.

In certain embodiments, a processor 20a can be configured to facilitate implementation of various processes described herein. The processor 20a can implement various computer program instructions. The processor 20a can be a general purpose computer, special purpose computer, or other programmable data processing apparatus.

In certain embodiments, these computer program instructions may also be stored in a computer-readable memory 19 that can direct the processor 20a to operate in a particular manner, such that the instructions stored in the computer-readable memory 19.

The illustrated wireless device 11 also includes the power management system 30, which can be used to provide power amplifier supply voltages to one or more of the power amplifiers 17a, 17b. For example, the power management system 30 can be configured to change the supply voltages provided to the power amplifiers 17a, 17b to improve efficiency, such as power added efficiency (PAE). The power management system 30 can be used to provide average power tracking (APT) and/or envelope tracking (ET). Furthermore, as will be described in detail further below, the power management system 30 can include one or more low dropout (LDO) regulators used to generate power amplifier supply voltages for one or more stages of the power amplifiers 17a, 17b. In the illustrated implementation, the power management system 30 is controlled using a power control signal generated by the transceiver 13. In certain configurations, the power control signal is provided by the transceiver 13 to the power management system 30 over an interface, such as a serial peripheral interface (SPI) or Mobile Industry Processor Interface (MIPI).

In certain configurations, the wireless device 11 may operate using carrier aggregation. Carrier aggregation can be used for both Frequency Division Duplexing (FDD) and Time Division Duplexing (TDD), and may be used to aggregate a plurality of carriers or channels, for instance up to five carriers. Carrier aggregation includes contiguous aggregation, in which contiguous carriers within the same operating frequency band are aggregated. Carrier aggregation can also be non-contiguous, and can include carriers separated in frequency within a common band or in different bands.

From the foregoing description, it will be appreciated that an inventive hexagonal ferrites and manufacturing methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A method for increasing the resonant frequency of a hexagonal ferrite material, the method comprising:
   doping a Y phase hexagonal ferrite material including strontium, cobalt, iron, and oxygen with a univalent alkali metal on a strontium site; and
   charge compensating on a cobalt site of the hexagonal ferrite material.

2. The method of claim 1 wherein the hexagonal ferrite material is doped with silicon, aluminum, manganese, or any combination of the three.

3. The method of claim 1 wherein the hexagonal ferrite material is doped with silicon acting as a grain growth inhibitor.

4. The method of claim 1 wherein the hexagonal ferrite material is doped with manganese, preventing reduction of the iron in the composition to $Fe^{3+}$.

5. The method of claim 1 wherein scandium is used for charge compensating.

6. The method of claim 1 wherein indium is used for charge compensating.

7. The method of claim 1 wherein the hexagonal ferrite material has a loss factor of less than about 6 at a frequency of 1 GHz.

8. A hexagonal ferrite material having enhanced resonant frequency comprising:
   a Y phase hexagonal ferrite material including strontium, cobalt, iron, and oxygen, the hexagonal ferrite material being doped with a univalent alkali metal on a strontium site, and the hexagonal ferrite material charge compensated with scandium or indium.

9. The hexagonal ferrite material of claim 8 wherein the hexagonal ferrite material is doped with silicon, aluminum, manganese, or any combination of the three.

10. The hexagonal ferrite material of claim 8 wherein the hexagonal ferrite material is doped with silicon acting as a grain growth inhibitor.

11. The hexagonal ferrite material of claim 8 wherein the hexagonal ferrite material is doped with manganese preventing reduction of the iron in the composition to $Fe^{3+}$.

12. The hexagonal ferrite material of claim 8 wherein scandium is used for charge compensating.

13. The hexagonal ferrite material of claim 8 wherein indium is used for charge compensating.

14. The hexagonal ferrite material of claim 8 wherein the hexagonal ferrite material has a loss factor of less than about 6 at a frequency of 1 GHz.

15. A radiofrequency device comprising:
    a Y phase hexagonal ferrite material including strontium, cobalt, iron, and oxygen, the hexagonal ferrite material being doped with a univalent alkali metal on a strontium site and doped for charge compensation on a cobalt site.

16. The radiofrequency device of claim 15 wherein the hexagonal ferrite material is doped with silicon, aluminum, manganese, or any combination of the three.

17. The radiofrequency device of claim 15 wherein scandium is used for charge compensating.

18. The radiofrequency device of claim 15 wherein indium is used for charge compensating.

19. The radiofrequency device of claim 15 wherein the hexagonal ferrite material has a loss factor of less than about 6 at a frequency of 1 GHz.

20. The radiofrequency device of claim 15 wherein the device is an antenna.

* * * * *